(12) United States Patent
Wenren et al.

(10) Patent No.: US 12,326,543 B2
(45) Date of Patent: Jun. 10, 2025

(54) ZOOM LENS

(71) Applicant: ZHEJIANG SUNNY OPTICS CO., LTD., Yuyao (CN)

(72) Inventors: Jianke Wenren, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 1065 days.

(21) Appl. No.: 17/318,304

(22) Filed: May 12, 2021

(65) Prior Publication Data

US 2021/0382282 A1 Dec. 9, 2021

(30) Foreign Application Priority Data

Jun. 5, 2020 (CN) .......................... 202010503775.6

(51) Int. Cl.
*G02B 13/00* (2006.01)
*G02B 15/14* (2006.01)

(52) U.S. Cl.
CPC ....... *G02B 13/0045* (2013.01); *G02B 13/009* (2013.01); *G02B 15/1421* (2019.08); *G02B 15/1461* (2019.08)

(58) Field of Classification Search
CPC .............. G02B 13/0045; G02B 13/009; G02B 15/1421; G02B 15/1461
See application file for complete search history.

(56) References Cited

U.S. PATENT DOCUMENTS

| | | | | |
|---|---|---|---|---|
| 4,682,860 | A * | 7/1987 | Tanaka .................. | G02B 15/142 359/692 |
| 2014/0118839 | A1* | 5/2014 | Sugita .................. | G02B 15/173 359/683 |
| 2014/0333821 | A1* | 11/2014 | Hagiwara ............ | G02B 15/173 359/557 |
| 2015/0015966 | A1* | 1/2015 | Ida ........................ | G02B 15/177 359/683 |
| 2016/0349492 | A1* | 12/2016 | Maetaki ............ | G02B 15/1461 |
| 2017/0192203 | A1* | 7/2017 | Chang ................. | G02B 13/0045 |
| 2017/0199360 | A1* | 7/2017 | Chang .................. | G02B 15/142 |
| 2018/0348481 | A1* | 12/2018 | Iwamoto .................. | G02B 9/64 |

* cited by examiner

*Primary Examiner* — Nicholas R. Pasko
(74) *Attorney, Agent, or Firm* — Birch, Stewart, Kolasch & Birch, LLP

(57) ABSTRACT

A zoom lens includes in order from an object side to an image side along an optical axis a first lens group having a positive refractive power, including a first lens disposed along the optical axis, and a second lens group having a negative refractive power, including a second lens, a third lens, a fourth lens, a fifth lens, a sixth lens, and a seventh lens disposed in order along the optical axis. Positions of the second lens to the seventh lens on the optical axis can be changed to achieve continuous zooming of the zoom lens. A total effective focal length ft of the zoom lens when it is in a final state and a total effective focal length fs of the zoom lens when it is in an initial state satisfy 1.3<ft/fs<1.5.

11 Claims, 12 Drawing Sheets

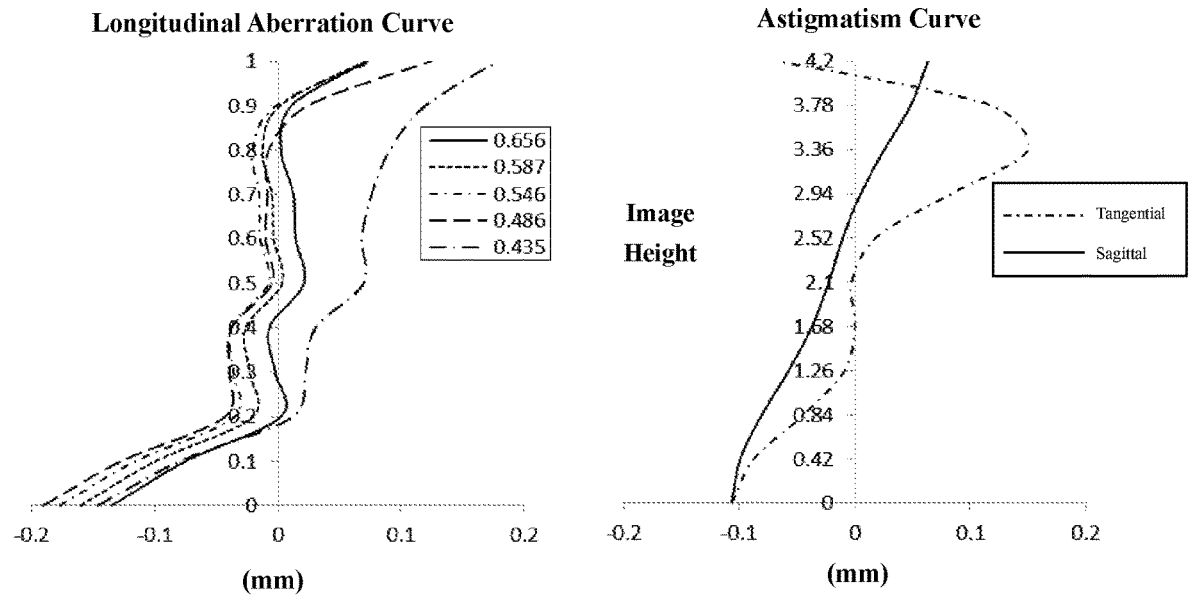
Fig. 4A
Fig. 4B
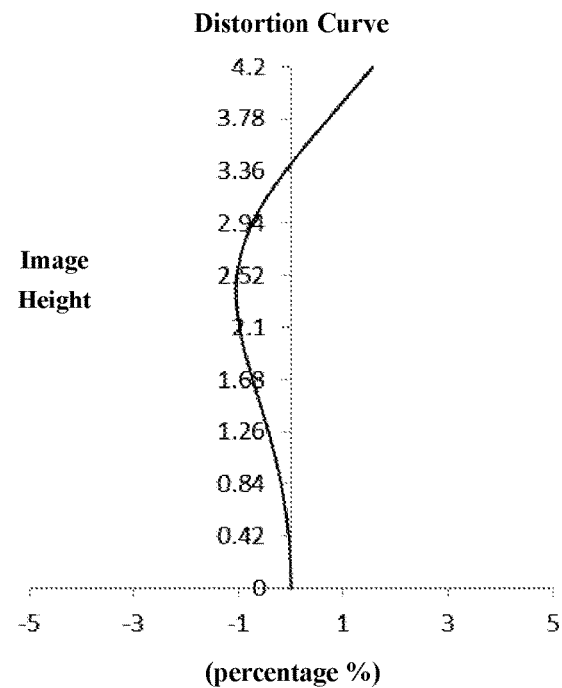
Fig. 4C

ZOOM LENS

The present application claims the priority of Chinese patent application No. 202010503775.6, filed on Jun. 5, 2020, which is hereby incorporated by reference in its entirety.

TECHNICAL FIELD

The present application relates to the field of optical elements, and specifically, to a zoom lens.

TECHNICAL BACKGROUND

With the development of science and technology, the development of lenses for portable electronic products such as mobile phones is also advancing by leaps and bounds. Today, in order to achieve a zoom photographing effect, portable electronic products such as mobile phones usually adopt a solution of "baton"-type zoom, that is, the switching between three lenses of "wide-angle lens, standard lens, and telephoto lens" is used to simulate the zoom effect.

However, the disadvantages of this multi-lens solution are very conspicuous. Firstly, it needs to switch between multiple lenses when simulating the zoom effect by the multiple lenses, so that the zoom is incoherent. At the same time, the switching of the lenses may cause unstable white balance, and the visual effect is barely satisfactory when in use. Secondly, the principle of digital crop zoom is also used in the process of switching the focal length from the wide-angle state to the standard state or from the standard state to the telephoto state, and there is a large loss in performance.

SUMMARY

One aspect of the present application provides a zoom lens, comprising, in order from an object side to an image side along an optical axis: a first lens group having a positive refractive power, comprising a first lens disposed along the optical axis; and a second lens group having a negative refractive power, comprising a second lens, a third lens, a fourth lens, a fifth lens, a sixth lens, and a seventh lens disposed in order along the optical axis; wherein positions of the first lens to the seventh lens on the optical axis are changed to achieve continuous zooming of the zoom lens; and a total effective focal length ft of the zoom lens when it is in a final state and a total effective focal length fs of the zoom lens when it is in an initial state may satisfy $1.3 < ft/fs < 1.5$.

In an implementation, there is at least one aspherical lens surface from an object side surface of the first lens to an image side surface of the seventh lens.

In an implementation, a difference $\Delta f$ between the total effective focal length of the zoom lens when it is in the initial state and the total effective focal length of the zoom lens when it is in the final state, and a difference $\Delta TTL$ between a distance from an object side surface of the first lens to an imaging plane of the zoom lens on the optical axis when the zoom lens is in the initial state and a distance from the object side surface of the first lens to the imaging plane of the zoom lens on the optical axis when the zoom lens is in the final state may satisfy $1.5 < |\Delta f|/|\Delta TTL| < 2.0$.

In an implementation, an effective focal length F1 of the first lens group and a difference $\Delta f$ between the total effective focal length of the zoom lens when it is in the initial state and the total effective focal length of the zoom lens when it is in the final state may satisfy $1.2 < F1/|\Delta f| < 1.5$.

In an implementation, an effective focal length F1 of the first lens group and an effective focal length F2 of the second lens group may satisfy $-1.61 \leq F1/F2 < -1.4$.

In an implementation, a difference $\Delta f$ between the total effective focal length of the zoom lens when it is in the initial state and the total effective focal length of the zoom lens when it is in the final state, and a center thickness CT1 of the first lens on the optical axis may satisfy $2.0 < |\Delta f|/CT1 < 2.6$.

In an implementation, an effective focal length f2 of the second lens, an effective focal length f3 of the third lens, an effective focal length f4 of the fourth lens, and an effective focal length f5 of the fifth lens may satisfy $-1.0 < (f2-f3)/(f4-f5) < -0.5$.

In an implementation, the total effective focal length ft of the zoom lens when it is in the final state, an effective focal length f6 of the sixth lens, and an effective focal length f7 of the seventh lens may satisfy $0.2 < ft/(f6-f7) < 1.0$.

In an implementation, the zoom lens further comprises a diaphragm disposed between the third lens and the fourth lens, and during zooming of the zoom lens, the diaphragm is movable along a direction of the optical axis.

In an implementation, a radius of curvature R7 of an object side surface of the fourth lens and a radius of curvature R8 of an image side surface of the fourth lens may satisfy $-2.5 < R7/R8 < -1.0$.

In an implementation, a sum $\Sigma CT$ of center thicknesses of the first lens to the seventh lens on the optical axis, a center thickness CT5 of the fifth lens on the optical axis, and a center thickness CT6 of the sixth lens on the optical axis may satisfy $2.0 < \Sigma CT/(CT5+CT6) < 3.0$.

In an implementation, a separation distance T56 between the fifth lens and the sixth lens on the optical axis, a separation distance T67 between the sixth lens and the seventh lens on the optical axis, and a sum $\Sigma AT$ of separation distances between any two adjacent lenses of the first lens to the seventh lens on the optical axis may satisfy $0.5 < (T56+T67)/\Sigma AT < 0.7$.

In an implementation, a separation distance T12s between the first lens and the second lens on the optical axis when the zoom lens is in the initial state, a separation distance T23s between the second lens and the third lens on the optical axis when the zoom lens is in the initial state, a separation distance T12t between the first lens and the second lens on the optical axis when the zoom lens is in the final state, and a separation distance T23t between the second lens and the third lens on the optical axis when the zoom lens is in the final state may satisfy $0.9 < (T12s+T23s)/(T12t+T23t) < 1.1$.

By reasonably distributing the refractive power and optimizing the optical parameters, the present application provides a zoom lens having at least one of continuous zooming, miniaturization and good imaging quality.

BRIEF DESCRIPTION OF THE DRAWINGS

Other features, objectives, and advantages of the present application will become more apparent by reading a detailed description of non-restrictive embodiments made with reference to the following drawings.

FIGS. 4A to 4C show a longitudinal aberration curve, astigmatism curve and distortion curve of the zoom lens according to Embodiment 1 of the present application when it is in the final state, respectively;

DETAILED DESCRIPTION OF THE EMBODIMENTS

Figure 1:
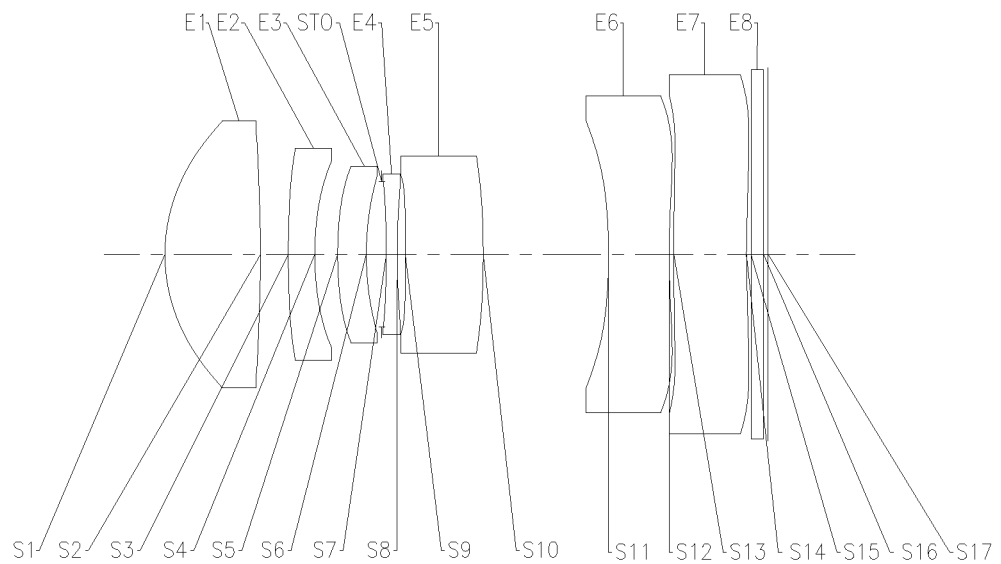
FIG. 1 shows a schematic structural diagram of a zoom lens according to Embodiment 1 of the present application when it is in an initial state.

In order to better understand the present application, various aspects of the present application will be described in more detail with reference to the drawings. It should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature. Therefore, without departing from the teachings of the present application, a first lens discussed below may also be referred to as a second lens or a third lens.

In the drawings, for convenience of explanation, the thickness, size, and shape of the lens have been slightly exaggerated. Specifically, the shapes of spherical or aspherical surfaces shown in the drawings are shown by way of example. That is, the shapes of the spherical or aspherical surfaces are not limited to those shown in the drawings. The drawings are only examples and are not drawn strictly to scale.

Herein, a paraxial region refers to a region near an optical axis. If a lens surface is convex and the position of the convex surface is not defined, then it means that the lens surface is convex at least in the paraxial region; and if the lens surface is concave and the position of the concave surface is not defined, then it means that the lens surface is concave at least in the paraxial region. A surface of each lens closest to an object to be captured is referred as an object side surface of the lens, and a surface of each lens closest to an imaging plane is referred as an image side surface of the lens.

It should also be understood that the terms "comprising", "comprise", "having", "including" and/or "include" when used in the present description, indicate the existence of stated features, elements and/or components, but does not exclude the presence or addition of one or more other features, elements, components and/or combinations thereof. Furthermore, when an expression such as "at least one of" appears before the list of listed features, it modifies the entire list of listed features, rather than the individual elements in the list. In addition, when describing the implementations of the present application, the use of "may" means "one or more implementations of the present application", and, the term "exemplary" refers to an example or illustration.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

The features, principles and other aspects of the present application will be described in detail below.

A zoom lens according to an exemplary implementation of the present application may include seven lenses having refractive powers, which are a first lens group including a first lens, and a second lens group including a second lens, a third lens, a fourth lens, a fifth lens, a sixth lens and a seventh lens, respectively. The seven lenses are arranged in order from an object side to an image side along an optical axis.

In an exemplary implementation, the first lens group may have a positive refractive power, and the second lens group may have a negative refractive power. The first lens group has a positive refractive power, and the second lens group has a negative refractive power, which is advantageous for balancing the aberration and improving the imaging quality.

In an exemplary implementation, the positions of the first lens to the seventh lens on the optical axis may be changed, that is, the separation distance between any two adjacent lenses of the first lens to the seventh lens on the optical axis may be adjusted, so as to achieve continuous zooming of the zoom lens.

In an exemplary implementation, the zoom lens according to the present application may satisfy 1.3<ft/fs<1.5, where ft is a total effective focal length of the zoom lens when it is in a final state; and fs is a total effective focal length of the zoom lens when it is in an initial state. By satisfying 1.3<ft/fs<1.5, the zoom lens can have a relatively strong zoom capability and a relatively wide zoom range. The initial state may be a state in which the zoom lens has a relatively short focal length (in comparison with the final state). The final state may be a state in which the zoom lens has a relatively long focal length (in comparison with the initial state).

In an exemplary implementation, the zoom lens according to the present application may satisfy 1.5<|Δf|/|ΔTTL|<2.0, where Δf is a difference between the total effective focal length of the zoom lens when it is in the initial state and the total effective focal length of the zoom lens when it is in the final state, and ΔTTL is a difference between a distance from an object side surface of the first lens to an imaging plane of the zoom lens on the optical axis when the zoom lens is in the initial state and a distance from the object side surface of the first lens to the imaging plane of the zoom lens on the optical axis when the zoom lens is in the final state. More specifically, Δf and ΔTTL may further satisfy 1.6<|Δf|/|ΔTTL|<1.9. By satisfying 1.5<|Δf|/|ΔTTL|<2.0, it is advantageous to reasonably control the total length of the zoom lens, so that when the focal length is increased, the amount of change in the total length of the zoom lens is relatively small, and the stroke of the zoom group during zooming can be effectively reduced.

In an exemplary implementation, the zoom lens according to the present application may satisfy 1.2<F1/|Δf|<1.5, wherein F1 is an effective focal length of the first lens group, and Δf is the difference between the total effective focal length of the zoom lens when it is in the initial state and the total effective focal length of the zoom lens when it is in the final state. By satisfying 1.2<F1/|Δf|<1.5, it is advantageous to control the effective focal length of the first lens group, so that the first lens group has a reasonable refractive power, the remaining refractive power is borne by the second lens group, and the zoom capability of the zoom optical system can be effectively improved.

In an exemplary implementation, the zoom lens according to the present application may satisfy −1.61≤F1/F2<−1.4, wherein F1 is the effective focal length of the first lens group, and F2 is an effective focal length of the second lens group. By satisfying −1.61≤F1//F2<−1.4, it is advantageous to reasonably distribute the refractive powers of the first lens group and the second lens group while facilitating control of the refractive power of the second lens group, so that the zoom capability of the optical system can be effectively improved.

In an exemplary implementation, the zoom lens according to the present application may satisfy 2.0<|Δf|/CT1<2.6, wherein Δf is the difference between the total effective focal length of the zoom lens when it is in the initial state and the total effective focal length of the zoom lens when it is in the final state, and CT1 is a center thickness of the first lens on the optical axis. More specifically, Δf and CT1 may further satisfy 2.3<|Δf|/CT1<2.6. By satisfying 2.0<|Δf|/CT1<2.6, it is advantageous to control the proportion of the thickness of the first lens group in the entire optical system, so that the volume of the entire optical system can be effectively controlled.

In an exemplary implementation, the zoom lens according to the present application may satisfy −1.0<(f2−f3)/(f4−f5)<−0.5, where f2 is an effective focal length of the second lens, f3 is an effective focal length of the third lens, f4 is an effective focal length of the fourth lens, and f5 is an effective focal length of the fifth lens. More specifically, f2, f3, f4 and f5 may further satisfy −1.0<(f2−f3)/(f4−f5)<−0.7. By satisfying −1.0<(f2−f3)/(f4−f5)<−0.5, it can effectively control the refractive powers of the second lens, the third lens, the fourth lens and the fifth lens, and can better balance the aberration between the lenses of the second lens group, thereby improving the imaging quality.

In an exemplary implementation, the zoom lens according to the present application may satisfy 0.2<ft/(f6−f7)<1.0, where ft is the total effective focal length of the zoom lens when it is in the final state, f6 is an effective focal length of the sixth lens, and f7 is an effective focal length of the seventh lens. More specifically, ft, f6, and f7 may further satisfy 0.2<ft/(f6−f7)<0.7. By satisfying 0.2<ft/(f6−f7)<1.0, it can effectively control the refractive powers of the sixth lens and the seventh lens, so that the aberration between the lenses of the second lens group can be better balanced, thereby improving the imaging quality.

In an exemplary implementation, the zoom lens according to the present application may satisfy −2.5<R7/R8<−1.0, where R7 is a radius of curvature of an object side surface of the fourth lens, and R8 is a radius of curvature of an image side surface of the fourth lens. More specifically, R7 and R8 may further satisfy −2.2<R7/R8<−1.2. By satisfying −2.5<R7/R8<−1.0, it is advantageous to control the refractive power of the fourth lens, so that the aberration between the lenses of the second lens group can be better balanced, thereby improving the imaging quality.

In an exemplary implementation, the zoom lens according to the present application may satisfy 2.0<ΣCT/(CT5+CT6)<3.0, where ΣCT is a sum of center thicknesses of the first lens to the seventh lens on the optical axis, CT5 is a center thickness of the fifth lens on the optical axis, and CT6 is a center thickness of the sixth lens on the optical axis. More specifically, ΣCT, CT5 and CT6 may further satisfy 2.1<ΣCT/(CT5−CT6)<2.8. By satisfying 2.0<ΣCT/(CT5−CT6)<3.0, it is advantageous to reduce the total length of the entire optical system, so that the volume of the optical module can be effectively reduced, and the amount of movement of the first lens to the seventh lens during zooming can also be reduced at the same time.

In an exemplary implementation, the zoom lens according to the present application may satisfy 0.5<(T56+T67)/ΣAT<0.7, where T56 is a separation distance between the fifth lens and the sixth lens on the optical axis, T67 is a separation distance between the sixth lens and the seventh lens on the optical axis, and ΣAT is a sum of separation distances between any two adjacent lenses from the first lens to the seventh lens on the optical axis. By satisfying 0.5<(T56+T67)/ΣAT<0.7, it is advantageous to reduce the total length of the entire optical system, so that the volume of the optical module can be effectively reduced, and at the same time, the volume of the second lens group can be reduced, facilitating the design of the motor for driving the zoom in the zoom system.

In an exemplary implementation, the zoom lens according to the present application can satisfy 0.9<(T12s+T23s)/(T12t+T23t)<1.1, where T12s is a separation distance between the first lens and the second lens on the optical axis when the zoom lens is in the initial state, T23s is a separation distance between the second lens and the third lens on the optical axis when the zoom lens is in the initial state, T12t is a separation distance between the first lens and the second lens on the optical axis when the zoom lens is in the final state, and T23t is a separation distance between the second lens and the third lens on the optical axis when the zoom lens is in the final state. By satisfying $0.9<(T12s+T23s)/(T12t+T23t)<1.1$, it is advantageous to control the amount of movement of the zoom group during zooming of the zoom system to be small, and thereby is advantageous for reducing the volume of the entire lens module, saving space while facilitating the design of the motor for driving the zoom.

In an exemplary implementation, the zoom lens according to the present application further includes a diaphragm disposed between the third lens and the fourth lens. During zooming of the zoom lens, the diaphragm is movable along a direction of the optical axis. The diaphragm is disposed between the third lens and the fourth lens, which is advantageous to reduce the size of the zoom lens. At the same time, the diaphragm is located in the middle of the optical system, which can make the optical system have a symmetrical structure, and is advantageous for balancing the aberration. Moreover, the diaphragm can move along the optical axis during zooming, which is advantageous to block some light during zooming, thereby improving the imaging quality. Optionally, the zoom lens described above may further include a filter for correcting color deviation and/or a protective glass for protecting a photosensitive element located on an imaging plane. In the present application, the positions of the first lens to the seventh lens on the optical axis may be changed to adjust the separation distance between any two adjacent lenses of the first lens to the seventh lens on the optical axis and/or the separation distance between the seventh lens and the filter and/or the protective glass on the optical axis, so as to achieve continuous zooming of the zoom lens. The present application proposes a zoom lens having the characteristics of continuous zooming, miniaturization, good imaging quality and so on. The zoom lens according to the above-mentioned implementations of the present application may adopt multiple lens sheets, for example, seven sheets as described above. The refractive power, surface shape and center thickness of each lens, the on-axis distances between the respective lenses, and the like, are reasonably distributed, which can effectively converge the incident light, reduce the total length of the imaging lens and improve the processability of the imaging lens, so that the zoom lens is more advantageous for production and processing.

In the implementations of the present application, at least one of lens surfaces of the respective lenses is an aspherical lens surface, that is, at least one lens surface from the object side surface of the first lens to the image side surface of the seventh lens is an aspherical lens surface. An aspherical lens is characterized in that the curvature changes continuously from the center of the lens to the periphery of the lens. Unlike a spherical lens having a constant curvature from the center of the lens to the periphery of the lens, the aspherical lens has better radius-of-curvature properties, and has the advantages of improving distortion aberration and improving astigmatism aberration. After the aspherical lens is adopted, the aberrations that occur during imaging can be eliminated as much as possible, thereby improving the imaging quality. Optionally, at least one of an object side surface and an image side surface of each of the first lens, the second lens, the third lens, the fourth lens, the fifth lens, the sixth lens and the seventh lens is an aspherical lens surface. Optionally, both an object side surface and an image side surface of each of the first lens, the second lens, the third lens, the fourth lens, the fifth lens, the sixth lens and the seventh lens are aspherical lens surfaces.

However, it should be understood by those skilled in the art that the number of lenses constituting the zoom lens can be changed without departing from the technical solution claimed in the present application, to obtain respective results and advantages described in the description. For example, although seven lenses have been described in the implementations as an example, the zoom lens is not limited to including the seven lenses. If necessary, the zoom lens may also include other numbers of lenses.

Specific embodiments of the zoom lens applicable to the above-mentioned implementations will be further described below with reference to the drawings.

Embodiment 1

Figure 2:
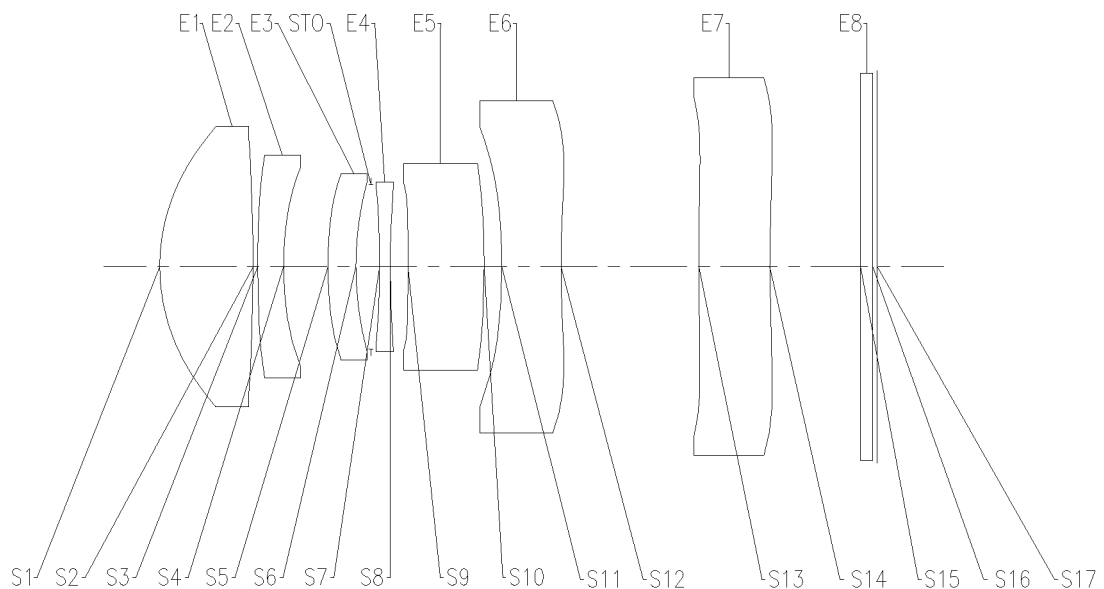
FIG. 2 shows a schematic structural diagram of the zoom lens according to Embodiment 1 of the present application when it is in a final state.

A zoom lens according to Embodiment 1 of the present application will be described below with reference to FIGS. 1 to 4C. FIG. 1 shows a schematic structural diagram of the zoom lens according to Embodiment 1 of the present application when it is in an initial state. FIG. 2 shows a schematic structural diagram of the zoom lens according to Embodiment 1 of the present application when it is in a final state.

As shown in FIGS. 1 and 2, the zoom lens includes a first lens E1, a second lens E2, a third lens E3, a diaphragm STO, a fourth lens E4, a fifth lens E5, a sixth lens E6, a seventh lens E7, a filter E8 and an imaging plane S17 in order from an object side to an image side.

The first lens E1 has a positive focal power, and has a convex object side surface S1 and a convex image side surface S2. The second lens E2 has a negative refractive power, and has a convex object side surface S3 and a concave image side surface S4. The third lens E3 has a negative focal power, and has a convex object side surface S5 and a concave image side surface S6. The fourth lens E4 has a negative focal power, and has a concave object side surface S7 and a concave image side surface S8. The fifth lens E5 has a positive refractive power, and has a convex object side surface S9 and a convex image side surface S10. The sixth lens E6 has a negative refractive power, and has a concave object side surface S11 and a concave image side surface S12. The seventh lens E7 has a negative refractive power, and has a convex object side surface S13 and a concave image side surface S14. The filter E8 has an object side surface S15 and an image side surface S16. Light from an object sequentially passes through the respective surfaces S1 to S16 and finally forms an image on the imaging plane S17.

Table 1 shows a table of basic parameters of the zoom lens of Embodiment 1, wherein the units of the radius of curvature, thickness/distance, and focal length are all millimeters (mm).

TABLE 1

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| S1 | Aspherical | 4.0584 | 2.0738 | 1.547 | 56.02 | 6.71 | 0.0097 |
| S2 | Aspherical | −31.1461 | T1 | | | | 84.2261 |
| S3 | Aspherical | 21.2245 | 0.5739 | 1.668 | 20.37 | −15.26 | 9.9056 |
| S4 | Aspherical | 6.8126 | T2 | | | | 2.5592 |
| S5 | Aspherical | 9.3729 | 0.6210 | 1.547 | 56.02 | −52.63 | 3.0092 |
| S6 | Aspherical | 6.9041 | 0.3356 | | | | 0.2196 |
| STO | Spherical | Infinity | T3 | | | | |
| S7 | Aspherical | −25.4150 | 0.2378 | 1.547 | 56.02 | −20.68 | 99.0000 |
| S8 | Aspherical | 20.4257 | T4 | | | | −16.7248 |
| S9 | Aspherical | 150.2170 | 1.6909 | 1.641 | 23.90 | 31.20 | 99.0000 |
| S10 | Aspherical | −22.9609 | T5 | | | | 91.5894 |
| S11 | Aspherical | −12.3768 | 1.3142 | 1.547 | 56.02 | −16.00 | −1.9269 |
| S12 | Aspherical | 30.9323 | T6 | | | | 4.9275 |
| S13 | Aspherical | 98.9568 | 1.5724 | 1.657 | 21.53 | −46.61 | 43.8067 |
| S14 | Aspherical | 23.2489 | T7 | | | | −0.0002 |
| S15 | Spherical | Infinity | 0.2730 | 1.519 | 64.20 | | |
| S16 | Spherical | Infinity | 0.1000 | | | | |
| S17 | Spherical | Infinity | | | | | |

In the present example, a separation distance T1 between the first lens and the second lens on the optical axis (i.e., a separation distance from an image side surface of the first lens E1 to an object side surface of the second lens E2 on the optical axis), a separation distance T2 between the second lens and the third lens on the optical axis (i.e., a separation distance from an image side surface of the second lens E2 to an object side surface of the third lens E3 on the optical axis), a separation distance T3 between the third lens and the fourth lens on the optical axis (i.e., a separation distance from an image side surface of the third lens E3 to an object side surface of the fourth lens E4 on the optical axis), a separation distance T4 between the fourth lens and the fifth lens on the optical axis (i.e., a separation distance from an image side surface of the fourth lens E4 to an object side surface of the fifth lens E5 on the optical axis), a separation distance T5 between the fifth lens and the sixth lens on the optical axis (i.e., a separation distance from an image side surface of the fifth lens E5 to an object side surface of the sixth lens E6 on the optical axis), a separation distance T6 between the sixth lens and the seventh lens on the optical axis (i.e., a separation distance from an image side surface of the sixth lens E6 to an object side surface of the seventh lens E7 on the optical axis), and a separation distance T7 between the seventh lens and the filter on the optical axis (i.e., a separation distance from an image side surface of the seventh lens E7 to an object side surface of the filter E8 on the optical axis) are changed to achieve switching of the zoom lens from the initial state to the final state or from the final state to the initial state.

Table 2 shows specific parameter values of the separation distances T1-T7 between any two adjacent lens sheets of the first lens to the filter on the optical axis when the zoom lens of Embodiment 1 is in the initial state and the final state, wherein the units of T1, T2, T3, T4, T5, T6 and T7 are all millimeters (mm).

TABLE 2

| | T1 | T2 | T3 | T4 | T5 | T6 | T7 |
|---|---|---|---|---|---|---|---|
| Initial state | 0.6001 | 0.4973 | 0.1000 | 0.1716 | 2.7179 | 0.1000 | 0.1000 |

TABLE 2-continued

| | T1 | T2 | T3 | T4 | T5 | T6 | T7 |
|---|---|---|---|---|---|---|---|
| Final state | 0.1000 | 0.9852 | 0.1888 | 0.3917 | 0.3920 | 3.0587 | 2.0145 |

In the present example, a total effective focal length fs of the zoom lens when it is in the initial state is 13.00 mm, a total effective focal length ft of the zoom lens when it is in the final state is 18.22 mm, the maximum field of view FOVs of the zoom lens when it is in the initial state is 34.4°, and the maximum field of view FOVt of the zoom lens when it is in the final state is 25.1°. The zoom lens can achieve continuous zooming in a focal length range of 13.00 mm to 18.22 mm.

In Embodiment 1, both the object side surface and image side surface of any one of the first lens E1 to the seventh lens E7 are aspherical, and the surface shape x of each aspherical lens can be defined by using but not limited to the following aspherical formula:

$$x = \frac{ch^2}{1 + \sqrt{1-(k+1)c^2h^2}} + \sum A_i h^i \quad (1)$$

where x is a distance vector height from a vertex of the aspherical surface when the aspherical surface is at a height of h along the optical axis direction; c is paraxial curvature of the aspherical surface, c=1/R (that is, the paraxial curvature c is the reciprocal of the radius of curvature R in Table 1 above); k is a conic coefficient; and Ai is a correction coefficient of an i-th order of the aspherical surface. Higher-order coefficients $A_4, A_6, A_8, A_{10}, A_{12}, A_{14}, A_{16}, A_{18}$ and $A_{20}$ of each aspherical lens surface S1 to S14 that is applicable in Embodiment 1 are given in Table 3 below.

TABLE 3

| Surface No. | A4 | A6 | A8 | A10 | A12 | A14 | A16 | A18 | A20 |
|---|---|---|---|---|---|---|---|---|---|
| S1 | −1.1226E−01 | −3.4284E−02 | −1.2345E−02 | −5.0599E−03 | −1.4953E−03 | −4.4401E−04 | −1.3569E−04 | −1.4279E−05 | −4.5227E−05 |
| S2 | 8.5769E−02 | −1.3994E−02 | −7.0656E−03 | 3.8991E−04 | −1.3541E−04 | 2.1410E−04 | 8.3021E−05 | 7.8984E−06 | 1.4355E−05 |
| S3 | 2.4208E−02 | 1.5316E−02 | −7.5357E−03 | 3.3479E−03 | −1.6145E−03 | 3.4650E−04 | −8.2247E−05 | 2.5045E−05 | 7.1406E−05 |
| S4 | 7.1049E−03 | 1.3347E−02 | −4.8226E−03 | 2.5626E−03 | −9.9393E−04 | 3.8374E−05 | −6.5987E−05 | −6.5284E−05 | 3.0862E−05 |
| S5 | 7.2372E−02 | 3.7908E−03 | −1.2047E−03 | 9.6593E−04 | 1.4493E−04 | 8.8565E−05 | −9.5671E−05 | −3.3159E−05 | −3.1349E−05 |
| S6 | 2.2999E−03 | −1.3638E−03 | −5.1892E−04 | −4.5586E−04 | 1.7585E−04 | 1.6043E−04 | 0.0000E+00 | 0.0000E+00 | 0.0000E+00 |
| S7 | −8.5678E−03 | −9.2066E−04 | −4.7961E−04 | 9.0462E−04 | −4.7542E−04 | 3.9407E−04 | −6.0000E−05 | 0.0000E+00 | 0.0000E+00 |
| S8 | −1.5677E−03 | −6.0905E−03 | −2.4264E−03 | 2.1506E−03 | −1.3679E−03 | 4.5341E−04 | −9.2754E−05 | 0.0000E+00 | 0.0000E+00 |
| S9 | −1.0017E−01 | −9.7237E−03 | −3.3787E−03 | 6.4600E−04 | −7.6078E−04 | 1.2460E−04 | 0.0000E+00 | 0.0000E+00 | 0.0000E+00 |
| S10 | −8.8973E−03 | 5.8890E−03 | 8.4334E−04 | 7.6205E−05 | 1.4585E−06 | 5.4868E−05 | 0.0000E+00 | 0.0000E+00 | 0.0000E+00 |
| S11 | −2.1804E−01 | 1.1774E−01 | 2.6779E−02 | −1.4647E−02 | 4.6411E−03 | −3.5835E−03 | 1.5684E−03 | −2.9858E−04 | 7.4289E−06 |
| S12 | −1.2807E−01 | −4.4552E−02 | 1.4192E−02 | −3.0468E−03 | 3.1009E−04 | 4.0434E−05 | −1.9363E−05 | 2.5283E−06 | −1.1326E−07 |
| S13 | −5.9922E−02 | −2.5627E−02 | −3.5859E−03 | 4.3160E−03 | −1.3581E−03 | 2.7096E−04 | −3.5287E−05 | 2.5917E−06 | −7.9211E−08 |
| S14 | −3.0502E−01 | 1.3111E−02 | −1.4713E−02 | 5.8729E−03 | −1.0607E−03 | 5.5696E−05 | 2.0309E−05 | −4.2821E−06 | 2.4655E−07 |

Figure 3A:
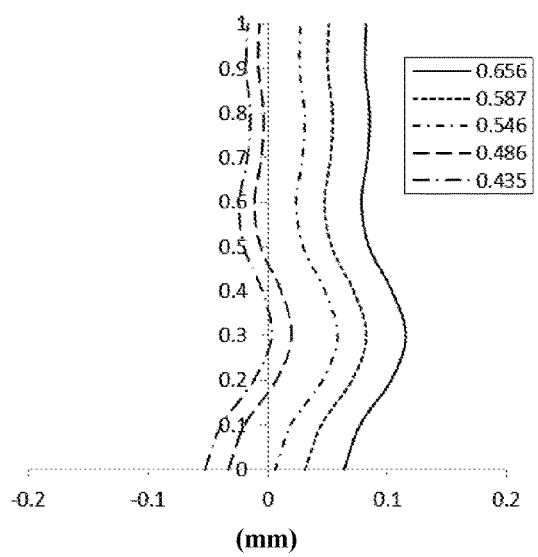
FIGS. 3A to 3C show a longitudinal aberration curve, astigmatism curve and distortion curve of the zoom lens according to Embodiment 1 of the present application when it is in the initial state, respectively.
Figure 3B:
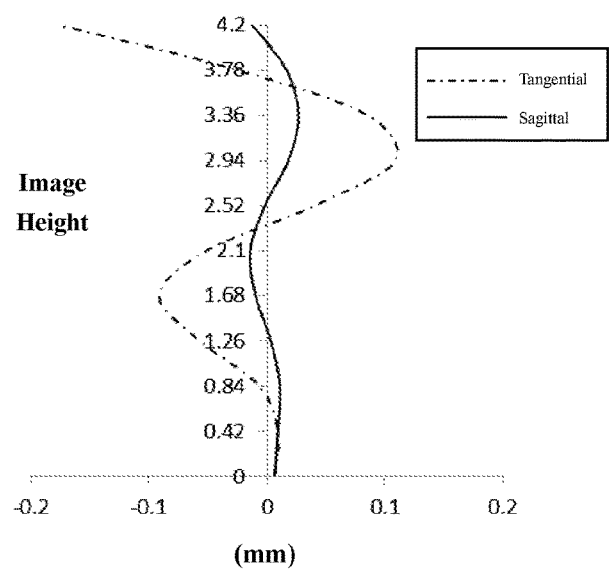
Figure 3C:
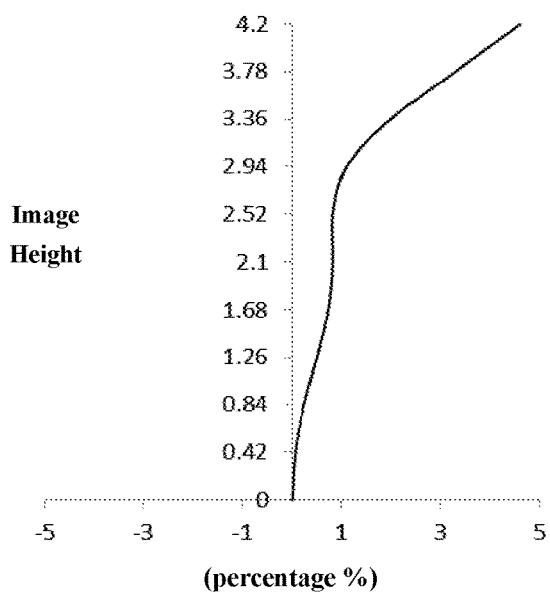

FIGS. 3A and 4A show longitudinal aberration curves of the zoom lens of Embodiment 1 when it is in the initial state and the final state, respectively, wherein the longitudinal aberration curve represents the deviation of the converged focal point after light of different wavelengths passes through the lens. FIGS. 3B and 4B show astigmatism curves of the zoom lens of Embodiment 1 when it is in the initial state and the final state, respectively, wherein the astigmatism curve represents the curvature of the tangential image plane and the curvature of the sagittal image plane. FIGS. 3C and 4C show distortion curves of the zoom lens of Embodiment 1 when it is in the initial state and the final state, respectively, wherein the distortion curve represents distortion magnitude values corresponding to different image heights. According to FIGS. 3A to 4C, it can be seen that the zoom lens given in Embodiment 1 can achieve good imaging quality in all states.

Embodiment 2

Figure 5:
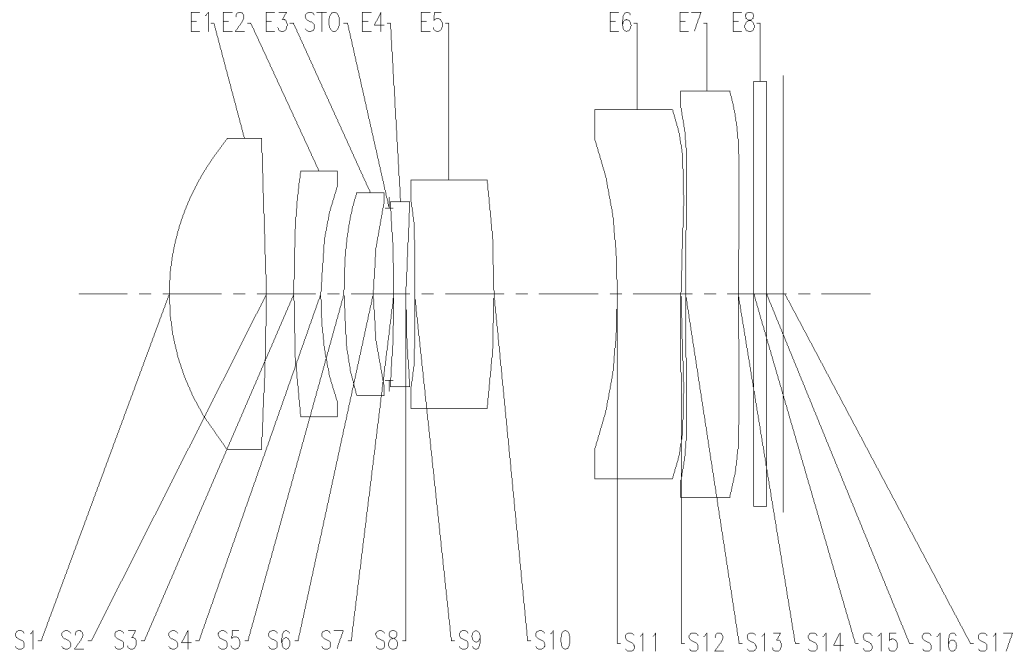
FIG. 5 shows a schematic structural diagram of a zoom lens according to Embodiment 2 of the present application when it is in an initial state.
Figure 6:
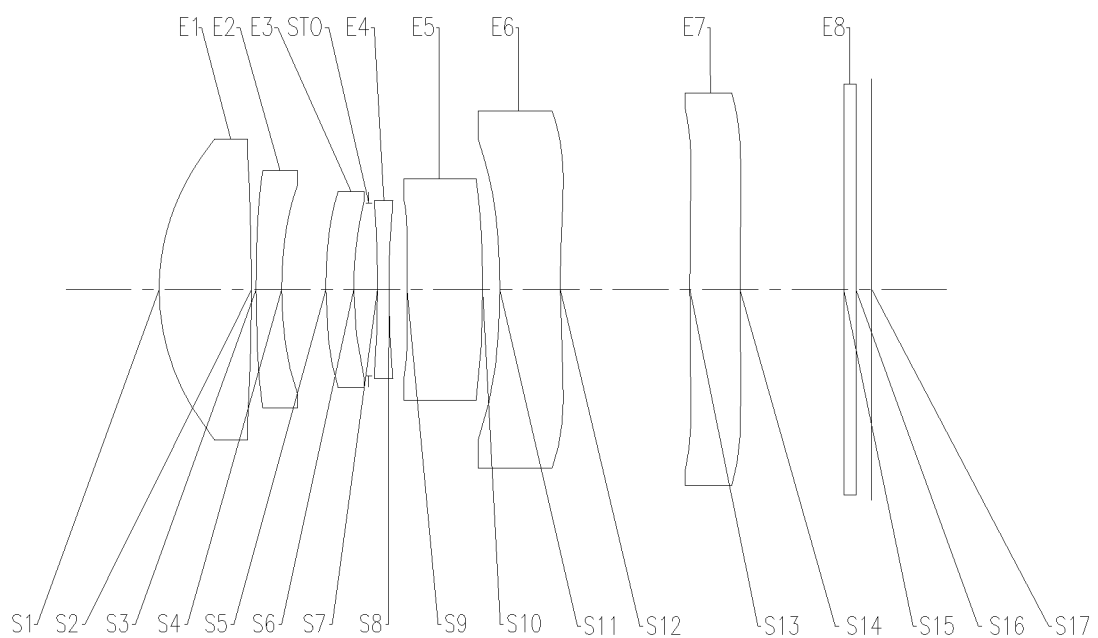
FIG. 6 shows a schematic structural diagram of the zoom lens according to Embodiment 2 of the present application when it is in a final state.

A zoom lens according to Embodiment 2 of the present application will be described below with reference to FIGS. 5 to 8C. In this embodiment and the following embodiments, for the sake of brevity, the description of parts similar to those in Embodiment 1 will be omitted. FIG. 5 shows a schematic structural diagram of the zoom lens according to Embodiment 2 of the present application when it is in an initial state. FIG. 6 shows a schematic structural diagram of the zoom lens according to Embodiment 2 of the present application when it is in a final state.

As shown in FIGS. 5 and 6, the zoom lens includes a first lens E1, a second lens E2, a third lens E3, a diaphragm STO, a fourth lens E4, a fifth lens E5, a sixth lens E6, a seventh lens E7, a filter E8 and an imaging plane S17 in order from an object side to an image side.

The first lens E1 has a positive focal power, and has a convex object side surface S1 and a convex image side surface S2. The second lens E2 has a negative refractive power, and has a convex object side surface S3 and a concave image side surface S4. The third lens E3 has a negative focal power, and has a convex object side surface S5 and a concave image side surface S6. The fourth lens E4 has a negative focal power, and has a concave object side surface S7 and a concave image side surface S8. The fifth lens E5 has a positive refractive power, and has a convex object side surface S9 and a convex image side surface S10. The sixth lens E6 has a negative refractive power, and has a concave object side surface S11 and a concave image side surface S12. The seventh lens E7 has a negative refractive power, and has a convex object side surface S13 and a concave image side surface S14. The filter E8 has an object side surface S15 and an image side surface S16. Light from an object sequentially passes through the respective surfaces S1 to S16 and finally forms an image on the imaging plane S17.

In the present example, a total effective focal length fs of the zoom lens when it is in the initial state is 13.27 mm, a total effective focal length ft of the zoom lens when it is in the final state is 18.19 mm, the maximum field of view FOVs of the zoom lens when it is in the initial state is 34.5°, and the maximum field of view FOVt of the zoom lens when it is in the final state is 25.1°. The zoom lens can achieve continuous zooming in a focal length range of 13.27 mm to 18.19 mm.

Table 4 shows a table of basic parameters of the zoom lens of Embodiment 2, wherein the units of the radius of curvature, thickness/distance, and focal length are all millimeters (mm).

TABLE 4

| Surface No. | Surface type | Radius of curvature | Thickness/ distance | Material Refractive index | Material Abbe number | Focal length | Conic coefficient |
|---|---|---|---|---|---|---|---|
| OBJ | Spherical | Infinity | Infinity | | | | |
| S1 | Aspherical | 4.0573 | 2.0648 | 1.547 | 56.02 | 6.71 | 0.0076 |
| S2 | Aspherical | −31.2475 | T1 | | | | 84.0086 |
| S3 | Aspherical | 22.2123 | 0.5708 | 1.668 | 20.37 | −15.05 | 10.6992 |
| S4 | Aspherical | 6.8509 | T2 | | | | 2.5477 |
| S5 | Aspherical | 9.4571 | 0.6218 | 1.547 | 56.02 | −53.23 | 2.9947 |
| S6 | Aspherical | 6.9715 | 0.3382 | | | | 0.3362 |
| STO | Spherical | Infinity | T3 | | | | |

TABLE 4-continued

| Surface No. | Surface type | Radius of curvature | Thickness/ distance | Material Refractive index | Abbe number | Focal length | Conic coefficient |
|---|---|---|---|---|---|---|---|
| S7 | Aspherical | −26.0196 | 0.2539 | 1.547 | 56.02 | −18.69 | 98.9771 |
| S8 | Aspherical | 16.8780 | T4 | | | | −9.7383 |
| S9 | Aspherical | 58.7205 | 1.6871 | 1.641 | 23.90 | 25.89 | 99.0000 |
| S10 | Aspherical | −22.8660 | T5 | | | | 89.8665 |
| S11 | Aspherical | −12.3768 | 1.3516 | 1.547 | 56.02 | −16.00 | −1.9269 |
| S12 | Aspherical | 30.9323 | T6 | | | | 4.9275 |
| S13 | Aspherical | 98.9568 | 1.1166 | 1.657 | 21.53 | −72.01 | 43.8067 |
| S14 | Aspherical | 31.8769 | T7 | | | | −0.0002 |
| S15 | Spherical | Infinity | 0.2730 | 1.519 | 64.20 | | |
| S16 | Spherical | Infinity | 0.3555 | | | | |
| S17 | Spherical | Infinity | | | | | |

In the present example, a separation distance T1 between the first lens and the second lens on the optical axis (i.e., a separation distance from an image side surface of the first lens E1 to an object side surface of the second lens E2 on the optical axis), a separation distance T2 between the second lens and the third lens on the optical axis (i.e., a separation distance from an image side surface of the second lens E2 to an object side surface of the third lens E3 on the optical axis), a separation distance T3 between the third lens and the fourth lens on the optical axis (i.e., a separation distance from an image side surface of the third lens E3 to an object side surface of the fourth lens E4 on the optical axis), a separation distance T4 between the fourth lens and the fifth lens on the optical axis (i.e., a separation distance from an image side surface of the fourth lens E4 to an object side surface of the fifth lens E5 on the optical axis), a separation distance T5 between the fifth lens and the sixth lens on the optical axis (i.e., a separation distance from an image side surface of the fifth lens E5 to an object side surface of the sixth lens E6 on the optical axis), a separation distance T6 between the sixth lens and the seventh lens on the optical axis (i.e., a separation distance from an image side surface of the sixth lens E6 to an object side surface of the seventh lens E7 on the optical axis), and a separation distance T7 between the seventh lens and the filter on the optical axis (i.e., a separation distance from an image side surface of the seventh lens E7 to an object side surface of the filter E8 on the optical axis) are changed to achieve switching of the zoom lens from the initial state to the final state or from the final state to the initial state.

Table 5 shows specific parameter values of the separation distances T1-T7 between any two adjacent lens sheets of the first lens to the filter on the optical axis when the zoom lens of Embodiment 2 is in the initial state and the final state, wherein the units of T1, T2, T3, T4, T5, T6 and T7 are all millimeters (mm).

TABLE 5

| | T1 | T2 | T3 | T4 | T5 | T6 | T7 |
|---|---|---|---|---|---|---|---|
| Initial state | 0.5824 | 0.4925 | 0.1005 | 0.1858 | 2.6187 | 0.1000 | 0.3332 |
| Final state | 0.1000 | 0.9864 | 0.1917 | 0.4053 | 0.3827 | 2.8923 | 2.3156 |

Table 6 shows higher-order coefficients of each aspherical lens surface that are applicable in Embodiment 2, wherein the surface shape of each aspherical surface can be defined by formula (1) given in Embodiment 1 described above.

TABLE 6

| Surface No. | A4 | A6 | A8 | A10 | A12 | A14 | A16 | A18 | A20 |
|---|---|---|---|---|---|---|---|---|---|
| S1 | −1.1343E−01 | −3.4153E−02 | −1.2465E−02 | −4.9526E−03 | −1.3579E−03 | −3.4524E−04 | −1.0256E−04 | −1.0037E−07 | −7.4684E−05 |
| S2 | 8.6378E−02 | −1.4232E−02 | −6.9239E−03 | 4.3755E−04 | −1.1657E−04 | 1.5641E−04 | 1.3908E−04 | −4.8287E−06 | 7.3804E−05 |
| S3 | 2.4843E−02 | 1.5508E−02 | −7.4105E−03 | 3.3030E−03 | −1.9704E−03 | 2.6596E−04 | −1.4487E−04 | −4.2114E−05 | 1.1195E−04 |
| S4 | 6.7368E−03 | 1.3643E−02 | −4.5113E−03 | 2.6347E−03 | −1.2666E−03 | −1.6812E−05 | −8.8969E−05 | −1.2334E−04 | 5.3903E−05 |
| S5 | 7.2257E−02 | 4.1643E−03 | −8.4431E−04 | 1.1337E−03 | 1.3112E−04 | 1.2604E−04 | −7.7717E−05 | −2.0120E−05 | −1.4352E−05 |
| S6 | 2.7950E−03 | −1.4177E−03 | −5.0538E−04 | −3.9594E−04 | 1.6488E−04 | 1.8908E−04 | 0.0000E+00 | 0.0000E+00 | 0.0000E+00 |
| S7 | −8.7654E−03 | −9.0491E−04 | −4.9719E−04 | 8.5272E−04 | −3.8661E−04 | 3.8445E−04 | −4.9661E−05 | 0.0000E+00 | 0.0000E+00 |
| S8 | −6.0667E−04 | −5.7024E−03 | −2.8476E−03 | 2.0857E−03 | −1.4653E−03 | 4.2896E−04 | −8.0731E−05 | 0.0000E+00 | 0.0000E+00 |
| S9 | −9.8700E−02 | −9.7706E−03 | −4.0299E−03 | 6.8655E−04 | −9.3707E−04 | 1.2331E−04 | 0.0000E+00 | 0.0000E+00 | 0.0000E+00 |
| S10 | −7.5331E−03 | 5.1056E−03 | 7.3774E−04 | 1.7789E−04 | −5.1915E−05 | 7.7546E−05 | 0.0000E+00 | 0.0000E+00 | 0.0000E+00 |
| S11 | −2.1804E−01 | 1.1774E−01 | 2.6779E−02 | −1.4647E−02 | 4.6411E−03 | −3.5835E−03 | 1.5684E−03 | −2.9858E−04 | 7.4289E−06 |
| S12 | −1.2807E−01 | −4.4552E−02 | 1.4192E−02 | −3.0468E−03 | 3.1009E−04 | 4.0434E−05 | −1.9363E−05 | 2.5283E−06 | −1.1326E−07 |
| S13 | −5.9922E−02 | −2.5627E−02 | −3.5859E−03 | 4.3160E−03 | −1.3581E−03 | 2.7096E−04 | −3.5287E−05 | 2.5917E−06 | −7.9211E−08 |
| S14 | −3.0502E−01 | 1.3111E−02 | −1.4713E−02 | 5.8729E−03 | −1.0607E−03 | 5.5696E−05 | 2.0309E−05 | −4.2821E−06 | 2.4655E−07 |

Figure 7A:
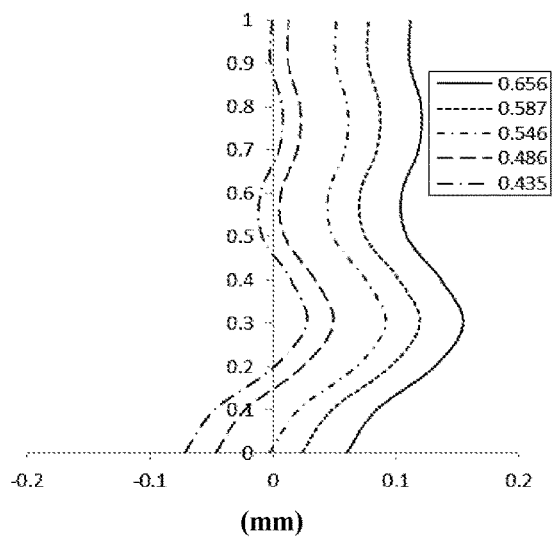
FIGS. 7A to 7C show a longitudinal aberration curve, astigmatism curve and distortion curve of the zoom lens according to Embodiment 2 of the present application when it is in the initial state, respectively.
Figure 7B:
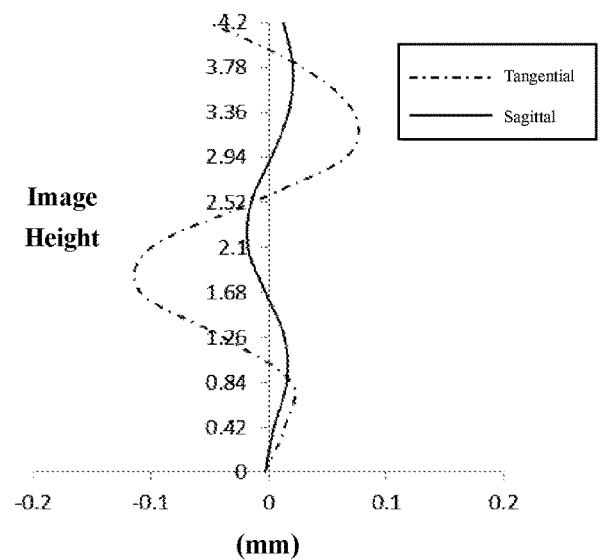
Figure 7C:
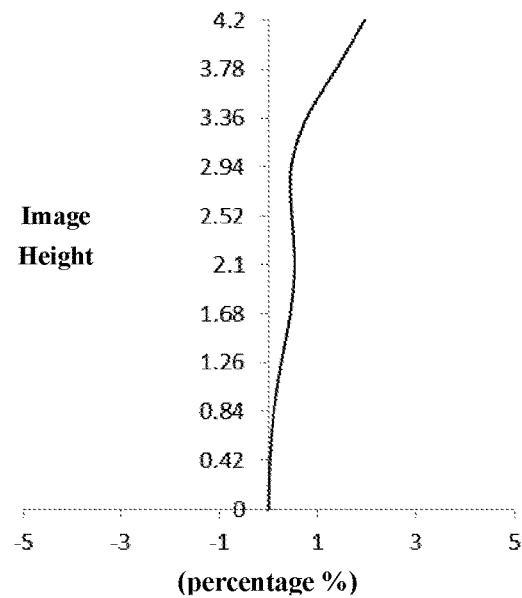
Figure 8A:
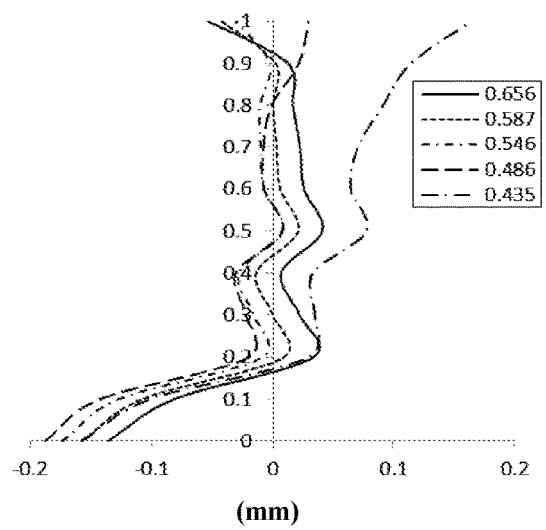
FIGS. 8A to 8C show a longitudinal aberration curve, astigmatism curve and distortion curve of the zoom lens according to Embodiment 2 of the present application when it is in the final state, respectively.
Figure 8B:
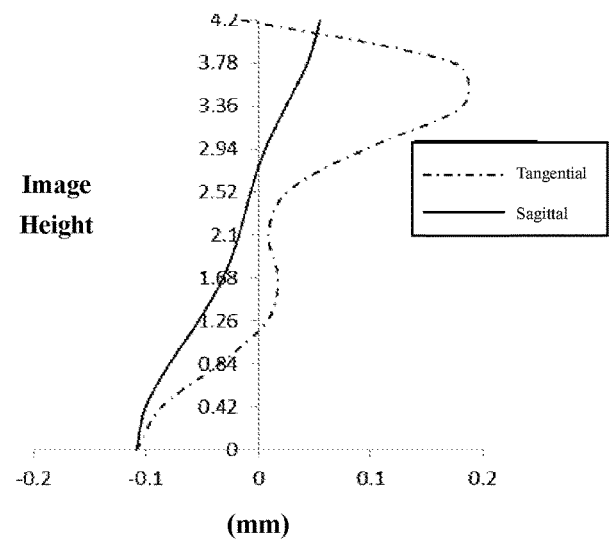
Figure 8C:
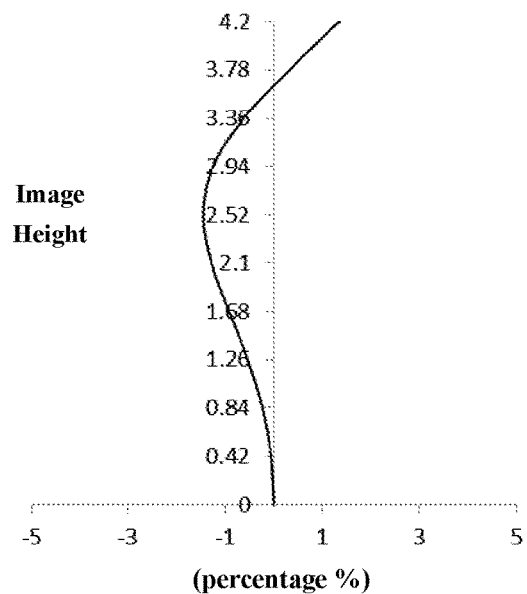

FIGS. 7A and 8A show longitudinal aberration curves of the zoom lens of Embodiment 2 when it is in the initial state and the final state, respectively, wherein the longitudinal aberration curve represents the deviation of the converged focal point after light of different wavelengths passes through the lens. FIGS. 7B and 8B show astigmatism curves of the zoom lens of Embodiment 2 when it is in the initial state and the final state, respectively, wherein the astigmatism curve represents the curvature of the tangential image plane and the curvature of the sagittal image plane. FIGS. 7C and 8C show distortion curves of the zoom lens of Embodiment 2 when it is in the initial state and the final state, respectively, wherein the distortion curve represents distortion magnitude values corresponding to different image heights. According to FIGS. 7A to 8C, it can be seen that the zoom lens given in Embodiment 2 can achieve good imaging quality in all states.

Embodiment 3

Figure 9:
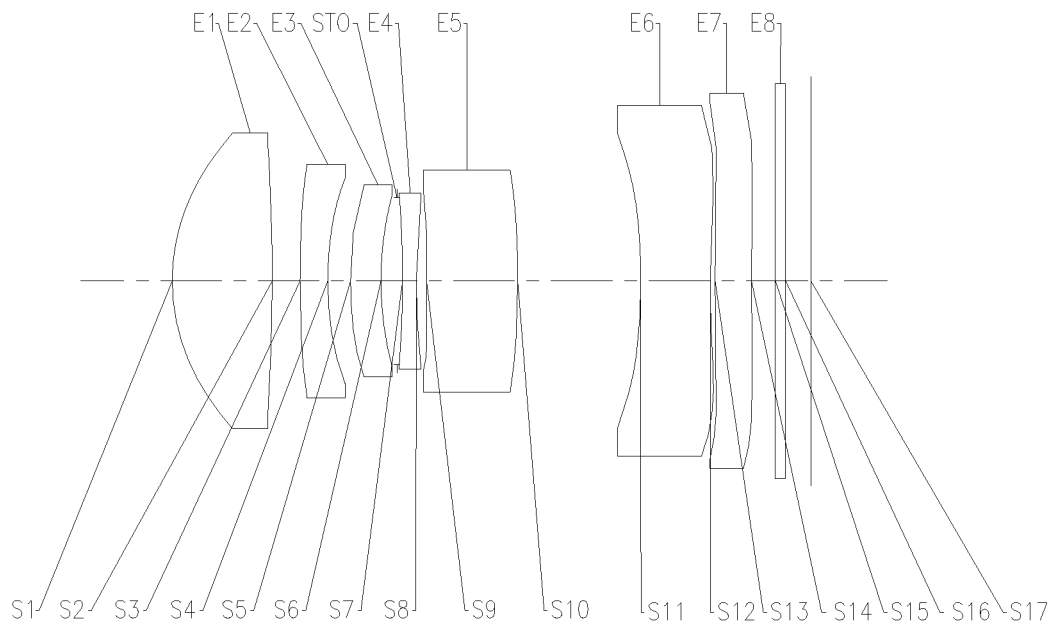
FIG. 9 shows a schematic structural diagram of a zoom lens according to Embodiment 3 of the present application when it is in an initial state.
Figure 10:
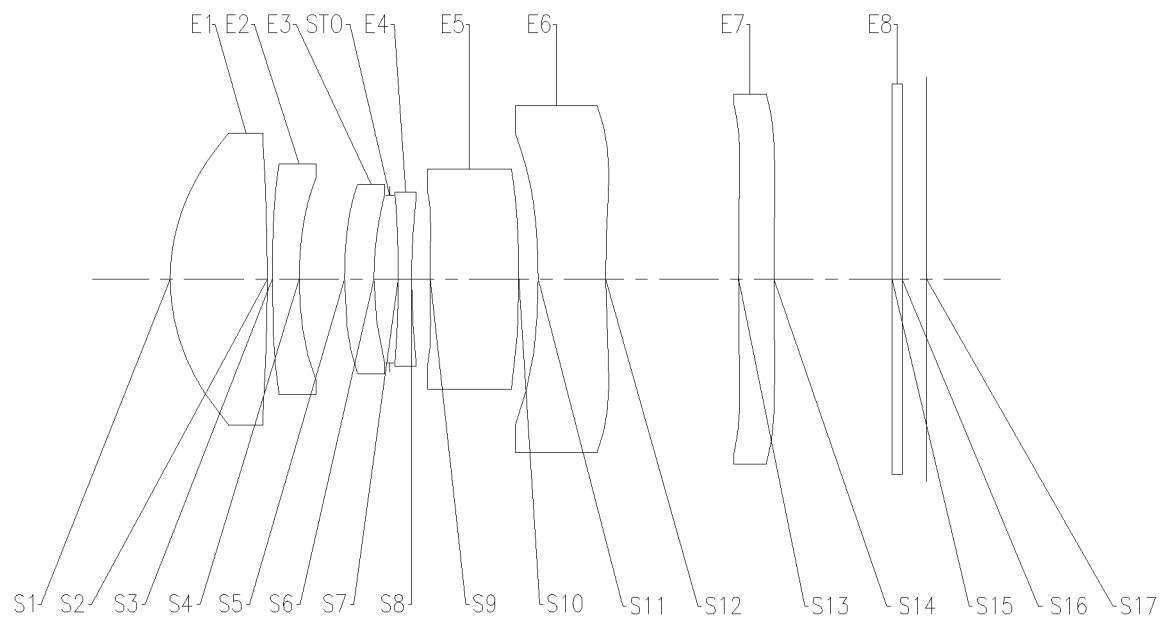
FIG. 10 shows a schematic structural diagram of the zoom lens according to Embodiment 3 of the present application when it is in a final state.

A zoom lens according to Embodiment 3 of the present application will be described below with reference to FIGS. 9 to 12C. FIG. 9 shows a schematic structural diagram of the zoom lens according to Embodiment 3 of the present application when it is in an initial state. FIG. 10 shows a schematic structural diagram of the zoom lens according to Embodiment 3 of the present application when it is in a final state.

As shown in FIGS. 9 and 10, the zoom lens includes a first lens E1, a second lens E2, a third lens E3, a diaphragm STO, a fourth lens E4, a fifth lens E5, a sixth lens E6, a seventh lens E7, a filter E8 and an imaging plane S17 in order from an object side to an image side.

The first lens E1 has a positive focal power, and has a convex object side surface S1 and a convex image side surface S2. The second lens E2 has a negative refractive power, and has a convex object side surface S3 and a concave image side surface S4. The third lens E3 has a negative focal power, and has a convex object side surface S5 and a concave image side surface S6. The fourth lens E4 has a negative focal power, and has a concave object side surface S7 and a concave image side surface S8. The fifth lens E5 has a positive refractive power, and has a convex object side surface S9 and a convex image side surface S10. The sixth lens E6 has a negative refractive power, and has a concave object side surface S11 and a concave image side surface S12. The seventh lens E7 has a negative refractive power, and has a convex object side surface S13 and a concave image side surface S14. The filter E8 has an object side surface S15 and an image side surface S16. Light from an object sequentially passes through the respective surfaces S1 to S16 and finally forms an image on the imaging plane S17.

In the present example, a total effective focal length fs of the zoom lens when it is in the initial state is 13.48 mm, a total effective focal length ft of the zoom lens when it is in the final state is 18.31 mm, the maximum field of view FOVs of the zoom lens when it is in the initial state is 34.2°, and the maximum field of view FOVt of the zoom lens when it is in the final state is 24.8°. The zoom lens can achieve continuous zooming in a focal length range of 13.48 mm to 18.31 mm.

Table 7 shows a table of basic parameters of the zoom lens of Embodiment 3, wherein the units of the radius of curvature, thickness/distance, and focal length are all millimeters (mm).

TABLE 7

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| S1 | Aspherical | 4.0554 | 2.0494 | 1.547 | 56.02 | 6.71 | 0.0056 |
| S2 | Aspherical | −31.3990 | T1 | | | | 83.6448 |
| S3 | Aspherical | 22.5951 | 0.5666 | 1.668 | 20.37 | −14.77 | 11.7179 |
| S4 | Aspherical | 6.7996 | T2 | | | | 2.5453 |
| S5 | Aspherical | 9.3010 | 0.6208 | 1.547 | 56.02 | −52.84 | 3.2109 |
| S6 | Aspherical | 6.8688 | 0.3290 | | | | 0.3307 |
| STO | Spherical | Infinity | T3 | | | | |
| S7 | Aspherical | −28.0039 | 0.2813 | 1.547 | 56.02 | −17.62 | 98.9985 |
| S8 | Aspherical | 14.7202 | T4 | | | | −6.5006 |
| S9 | Aspherical | 38.2857 | 1.8661 | 1.641 | 23.90 | 22.53 | 85.7537 |
| S10 | Aspherical | −22.7598 | T5 | | | | 85.4390 |
| S11 | Aspherical | −12.3768 | 1.4212 | 1.547 | 56.02 | −15.99 | −1.9269 |
| S12 | Aspherical | 30.9323 | T6 | | | | 4.9275 |
| S13 | Aspherical | 98.9568 | 0.7446 | 1.657 | 21.53 | −80.30 | 43.8067 |
| S14 | Aspherical | 34.3226 | T7 | | | | −0.0002 |
| S15 | Spherical | Infinity | 0.2100 | 1.519 | 64.20 | | |
| S16 | Spherical | Infinity | 0.5167 | | | | |
| S17 | Spherical | Infinity | | | | | |

In the present example, a separation distance T1 between the first lens and the second lens on the optical axis (i.e., a separation distance from an image side surface of the first lens E1 to an object side surface of the second lens E2 on the optical axis), a separation distance T2 between the second lens and the third lens on the optical axis (i.e., a separation distance from an image side surface of the second lens E2 to an object side surface of the third lens E3 on the optical axis), a separation distance T3 between the third lens and the fourth lens on the optical axis (i.e., a separation distance from an image side surface of the third lens E3 to an object side surface of the fourth lens E4 on the optical axis), a separation distance T4 between the fourth lens and the fifth lens on the optical axis (i.e., a separation distance from an image side surface of the fourth lens E4 to an object side surface of the fifth lens E5 on the optical axis), a separation distance T5 between the fifth lens and the sixth lens on the optical axis (i.e., a separation distance from an image side surface of the fifth lens E5 to an object side surface of the sixth lens E6 on the optical axis), a separation distance T6 between the sixth lens and the seventh lens on the optical axis (i.e., a separation distance from an image side surface of the sixth lens E6 to an object side surface of the seventh lens E7 on the optical axis), and a separation distance T7 between the seventh lens and the filter on the optical axis (i.e., a separation distance from an image side surface of the seventh lens E7 to an object side surface of the filter E8 on the optical axis) are changed to achieve switching of the zoom lens from the initial state to the final state or from the final state to the initial state.

Table 8 shows specific parameter values of the separation distances T1-T7 between any two adjacent lens sheets of the first lens to the filter on the optical axis when the zoom lens of Embodiment 3 is in the initial state and the final state, wherein the units of T1, T2, T3, T4, T5, T6 and T7 are all millimeters (mm).

TABLE 8

|  | T1 | T2 | T3 | T4 | T5 | T6 | T7 |
|---|---|---|---|---|---|---|---|
| Initial state | 0.5681 | 0.4677 | 0.1137 | 0.2115 | 2.5214 | 0.1000 | 0.4904 |
| Final state | 0.1000 | 0.9547 | 0.1822 | 0.3926 | 0.4067 | 2.7996 | 2.4876 |

Table 9 shows higher-order coefficients of each aspherical lens surface that are applicable in Embodiment 3, wherein the surface shape of each aspherical surface can be defined by formula (1) given in Embodiment 1 described above.

TABLE 9

| Surface No. | A4 | A6 | A8 | A10 | A12 | A14 | A16 | A18 | A20 |
|---|---|---|---|---|---|---|---|---|---|
| S1 | −1.1428E−01 | −3.4640E−02 | −1.2073E−02 | −4.9999E−03 | −1.6077E−03 | −5.0899E−04 | −2.3280E−04 | −9.3149E−05 | −1.0777E−04 |
| S2 | 8.6778E−02 | −1.4006E−02 | −6.7045E−03 | 9.5171E−05 | −1.1996E−04 | 1.4938E−04 | 1.6936E−04 | 5.9211E−05 | 1.1719E−04 |
| S3 | 2.5487E−02 | 1.6319E−02 | −7.1088E−03 | 3.4712E−03 | −1.7556E−03 | 2.7846E−04 | −1.1719E−04 | 3.8073E−05 | 4.9037E−05 |
| S4 | 6.6378E−03 | 1.3737E−02 | −4.2930E−03 | 2.9006E−03 | −1.2139E−03 | 2.0642E−05 | −1.3340E−04 | 5.9566E−06 | 3.7392E−05 |
| S5 | 7.2978E−02 | 3.9812E−03 | −7.4228E−04 | 1.0286E−03 | −3.7362E−05 | 2.0588E−04 | −7.3562E−05 | 1.9778E−05 | 8.4549E−06 |
| S6 | 2.7833E−03 | −1.5209E−03 | −6.0779E−04 | −3.8353E−04 | −1.6623E−05 | 2.3099E−04 | 0.0000E+00 | 0.0000E+00 | 0.0000E+00 |
| S7 | −8.8547E−03 | −8.3370E−04 | −9.9469E−04 | 7.1370E−04 | −3.4858E−04 | 4.0327E−04 | −8.1641E−05 | 0.0000E+00 | 0.0000E+00 |
| S8 | 3.1061E−04 | −6.2723E−03 | −3.3733E−03 | 1.8913E−03 | −9.8923E−04 | 2.7475E−04 | −1.4168E−04 | 0.0000E+00 | 0.0000E+00 |
| S9 | −9.8647E−02 | −1.1313E−02 | −4.0113E−03 | 4.4264E−04 | −5.5023E−04 | −8.3262E−07 | 0.0000E+00 | 0.0000E+00 | 0.0000E+00 |
| S10 | −8.0777E−03 | 3.8729E−03 | 7.7084E−04 | 1.2811E−04 | 1.3178E−04 | −1.5708E−05 | 0.0000E+00 | 0.0000E+00 | 0.0000E+00 |
| S11 | −2.1804E−01 | 1.1774E−01 | 2.6779E−02 | −1.4647E−02 | 4.6411E−03 | −3.5835E−03 | 1.5684E−03 | −2.9858E−04 | 7.4289E−06 |
| S12 | −1.2807E−01 | −4.4552E−02 | 1.4192E−02 | −3.0468E−03 | 3.1009E−04 | 4.0434E−05 | −1.9363E−05 | 2.5283E−06 | −1.1326E−07 |
| S13 | −5.9922E−02 | −2.5627E−02 | −3.5859E−03 | 4.3160E−03 | −1.3581E−03 | 2.7096E−04 | −3.5287E−05 | 2.5917E−06 | −7.9211E−08 |
| S14 | −3.0502E−01 | 1.3111E−02 | −1.4713E−02 | 5.8729E−03 | −1.0607E−03 | 5.5696E−05 | 2.0309E−05 | −4.2821E−06 | 2.4655E−07 |

Figure 11A:
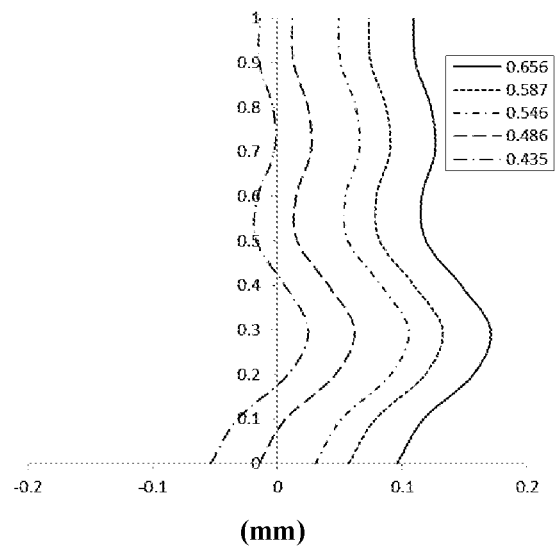
FIGS. 11A to 11C show a longitudinal aberration curve, astigmatism curve and distortion curve of the zoom lens according to Embodiment 3 of the present application when it is in the initial state, respectively.
Figure 11B:
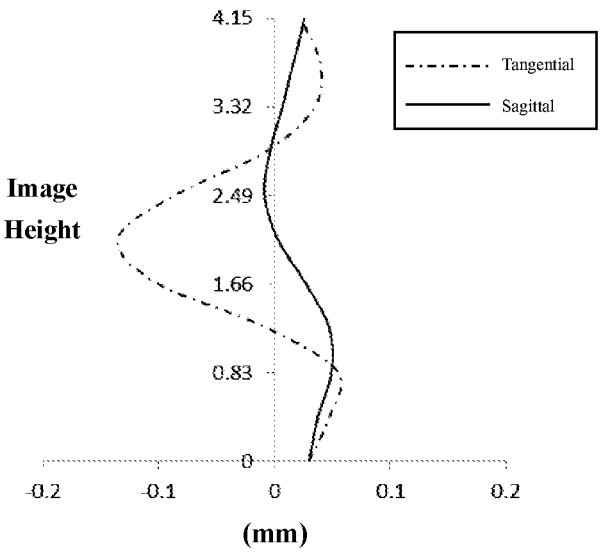
Figure 11C:
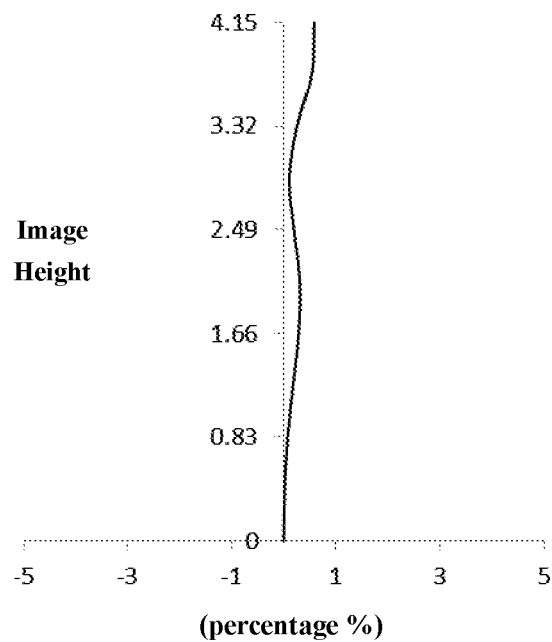
Figure 12A:
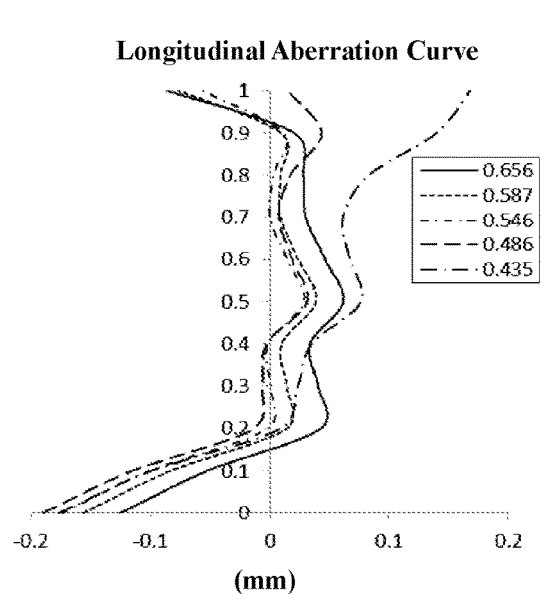
FIGS. 12A to 12C show a longitudinal aberration curve, astigmatism curve and distortion curve of the zoom lens according to Embodiment 3 of the present application when it is in the final state, respectively.
Figure 12B:
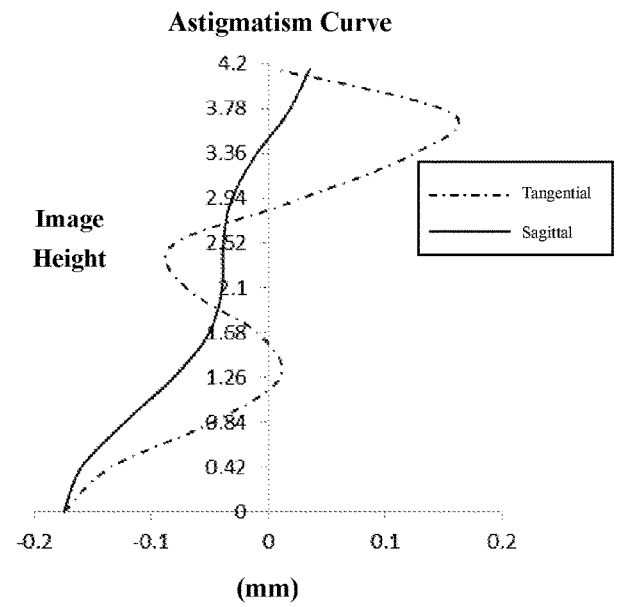
Figure 12C:
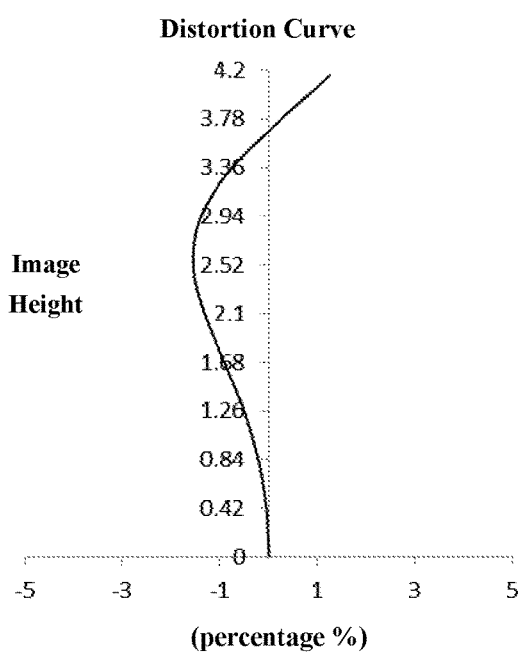

FIGS. 11A and 12A show longitudinal aberration curves of the zoom lens of Embodiment 3 when it is in the initial state and the final state, respectively, wherein the longitudinal aberration curve represents the deviation of the converged focal point after light of different wavelengths passes through the lens. FIGS. 11B and 12B show astigmatism curves of the zoom lens of Embodiment 3 when it is in the initial state and the final state, respectively, wherein the astigmatism curve represents the curvature of the tangential image plane and the curvature of the sagittal image plane. FIGS. 11C and 12C show distortion curves of the zoom lens of Embodiment 3 when it is in the initial state and the final state, respectively, wherein the distortion curve represents distortion magnitude values corresponding to different image heights. According to FIGS. 11A to 12C, it can be seen that the zoom lens given in Embodiment 3 can achieve good imaging quality in all states.

Embodiment 4

Figure 13:
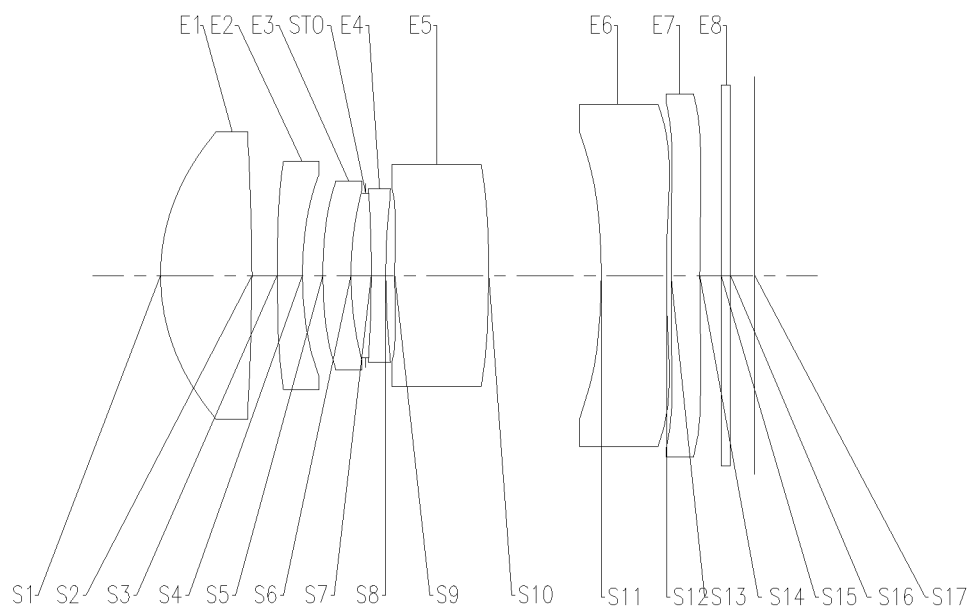
FIG. 13 shows a schematic structural diagram of a zoom lens according to Embodiment 4 of the present application when it is in an initial state.
Figure 14:
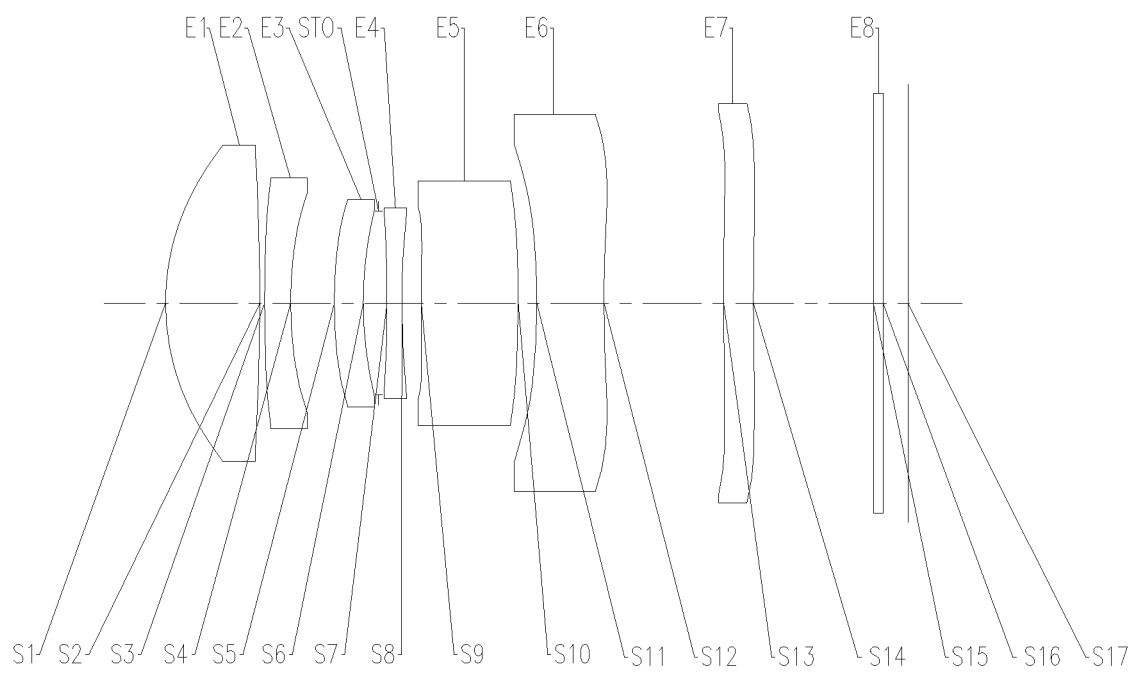
FIG. 14 shows a schematic structural diagram of the zoom lens according to Embodiment 4 of the present application when it is in a final state.

A zoom lens according to Embodiment 4 of the present application will be described below with reference to FIGS. 13 to 16C. FIG. 13 shows a schematic structural diagram of the zoom lens according to Embodiment 4 of the present application when it is in an initial state. FIG. 14 shows a schematic structural diagram of the zoom lens according to Embodiment 4 of the present application when it is in a final state.

As shown in FIGS. 13 and 14, the zoom lens includes a first lens E1, a second lens E2, a third lens E3, a diaphragm STO, a fourth lens E4, a fifth lens E5, a sixth lens E6, a seventh lens E7, a filter E8 and an imaging plane S17 in order from an object side to an image side.

The first lens E1 has a positive focal power, and has a convex object side surface S1 and a convex image side surface S2. The second lens E2 has a negative refractive power, and has a convex object side surface S3 and a concave image side surface S4. The third lens E3 has a negative focal power, and has a convex object side surface S5 and a concave image side surface S6. The fourth lens E4 has a negative focal power, and has a concave object side surface S7 and a concave image side surface S8. The fifth lens E5 has a positive refractive power, and has a convex object side surface S9 and a convex image side surface S10. The sixth lens E6 has a negative refractive power, and has a concave object side surface S11 and a concave image side surface S12. The seventh lens E7 has a negative refractive power, and has a convex object side surface S13 and a concave image side surface S14. The filter E8 has an object side surface S15 and an image side surface S16. Light from an object sequentially passes through the respective surfaces S1 to S16 and finally forms an image on the imaging plane S17.

In the present example, a total effective focal length fs of the zoom lens when it is in the initial state is 13.51 mm, a total effective focal length ft of the zoom lens when it is in the final state is 18.39 mm, the maximum field of view FOVs of the zoom lens when it is in the initial state is 34.2°, and the maximum field of view FOVt of the zoom lens when it is in the final state is 24.8°. The zoom lens can achieve continuous zooming in a focal length range of 13.51 mm to 18.39 mm.

Table 10 shows a table of basic parameters of the zoom lens of Embodiment 4, wherein the units of the radius of curvature, thickness/distance, and focal length are all millimeters (mm).

TABLE 10

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| S1 | Aspherical | 4.0548 | 2.0364 | 1.547 | 56.02 | 6.71 | 0.0048 |
| S2 | Aspherical | −31.4161 | T1 | | | | 83.5117 |
| S3 | Aspherical | 23.4972 | 0.5638 | 1.668 | 20.37 | −14.45 | 11.9495 |
| S4 | Aspherical | 6.7802 | T2 | | | | 2.5675 |
| S5 | Aspherical | 9.1223 | 0.6246 | 1.547 | 56.02 | −52.59 | 3.3532 |
| S6 | Aspherical | 6.7567 | 0.3294 | | | | 0.3373 |
| STO | Spherical | Infinity | T3 | | | | |
| S7 | Aspherical | −30.5303 | 0.3194 | 1.547 | 56.02 | −17.60 | 98.9085 |
| S8 | Aspherical | 14.0902 | T4 | | | | −4.2411 |
| S9 | Aspherical | 33.4885 | 2.0929 | 1.641 | 23.90 | 21.22 | 76.6463 |
| S10 | Aspherical | −22.3542 | T5 | | | | 79.6469 |
| S11 | Aspherical | −12.3768 | 1.4497 | 1.547 | 56.02 | −15.99 | −1.9269 |
| S12 | Aspherical | 30.9323 | T6 | | | | 4.9275 |
| S13 | Aspherical | 98.9568 | 0.6410 | 1.657 | 21.53 | −69.44 | 43.8067 |
| S14 | Aspherical | 31.1591 | T7 | | | | −0.0002 |
| S15 | Spherical | Infinity | 0.2100 | 1.519 | 64.20 | | |
| S16 | Spherical | Infinity | 0.5384 | | | | |
| S17 | Spherical | Infinity | | | | | |

In the present example, a separation distance T1 between the first lens and the second lens on the optical axis (i.e., a separation distance from an image side surface of the first lens E1 to an object side surface of the second lens E2 on the optical axis), a separation distance T2 between the second lens and the third lens on the optical axis (i.e., a separation distance from an image side surface of the second lens E2 to an object side surface of the third lens E3 on the optical axis), a separation distance T3 between the third lens and the fourth lens on the optical axis (i.e., a separation distance from an image side surface of the third lens E3 to an object side surface of the fourth lens E4 on the optical axis), a separation distance T4 between the fourth lens and the fifth lens on the optical axis (i.e., a separation distance from an image side surface of the fourth lens E4 to an object side surface of the fifth lens E5 on the optical axis), a separation distance T5 between the fifth lens and the sixth lens on the optical axis (i.e., a separation distance from an image side surface of the fifth lens E5 to an object side surface of the sixth lens E6 on the optical axis), a separation distance T6 between the sixth lens and the seventh lens on the optical axis (i.e., a separation distance from an image side surface of the sixth lens E6 to an object side surface of the seventh lens E7 on the optical axis), and a separation distance T7 between the seventh lens and the filter on the optical axis (i.e., a separation distance from an image side surface of the seventh lens E7 to an object side surface of the filter E8 on the optical axis) are changed to achieve switching of the zoom lens from the initial state to the final state or from the final state to the initial state.

Table 11 shows specific parameter values of the separation distances T1-T7 between any two adjacent lens sheets of the first lens to the filter on the optical axis when the zoom lens of Embodiment 4 is in the initial state and the final state, wherein the units of T1, T2, T3, T4, T5, T6 and T7 are all millimeters (mm).

TABLE 11

|  | T1 | T2 | T3 | T4 | T5 | T6 | T7 |
|---|---|---|---|---|---|---|---|
| Initial state | 0.5564 | 0.4555 | 0.1241 | 0.2011 | 2.5008 | 0.1000 | 0.4748 |
| Final state | 0.1000 | 0.9433 | 0.1818 | 0.4202 | 0.4011 | 2.5829 | 2.5881 |

Table 12 shows higher-order coefficients of each aspherical lens surface that are applicable in Embodiment 4, wherein the surface shape of each aspherical surface can be defined by formula (1) given in Embodiment 1 described above.

TABLE 12

| Surface No. | A4 | A6 | A8 | A10 | A12 | A14 | A16 | A18 | A20 |
|---|---|---|---|---|---|---|---|---|---|
| S1 | −1.1466E−01 | −3.4820E−02 | −1.1990E−02 | −5.0518E−03 | −1.6111E−03 | −5.3516E−04 | −2.3618E−04 | −1.0635E−04 | −9.3252E−05 |
| S2 | 8.6875E−02 | −1.3903E−02 | −6.6046E−03 | 7.0632E−05 | −1.1871E−04 | 1.0773E−04 | 1.7171E−04 | 5.2373E−05 | 1.0837E−04 |
| S3 | 2.5611E−02 | 1.6575E−02 | −6.7858E−03 | 3.5953E−03 | −1.6106E−03 | 2.8045E−04 | −7.6950E−05 | 3.4007E−05 | 4.3609E−05 |
| S4 | 6.8056E−03 | 1.4444E−02 | −3.9053E−03 | 3.1330E−03 | −1.0760E−03 | 6.2750E−05 | −1.0515E−04 | 4.1473E−06 | 2.3864E−05 |
| S5 | 7.3452E−02 | 3.8931E−03 | −4.0072E−04 | 1.2447E−03 | −1.1992E−04 | 1.8777E−04 | −1.1511E−04 | −2.7150E−05 | −2.6970E−05 |
| S6 | 2.8414E−03 | −1.6984E−03 | −7.4630E−04 | −2.2629E−04 | −8.6090E−05 | 2.2715E−04 | 0.0000E+00 | 0.0000E+00 | 0.0000E+00 |
| S7 | −8.9890E−03 | −4.7603E−04 | −1.7037E−03 | 4.6885E−04 | −1.5824E−04 | 3.1681E−04 | −1.0417E−04 | 0.0000E+00 | 0.0000E+00 |
| S8 | 1.1420E−03 | −6.8958E−03 | −3.6599E−03 | 1.2135E−03 | −5.4180E−04 | 1.6836E−04 | −1.1500E−04 | 0.0000E+00 | 0.0000E+00 |
| S9 | −9.8780E−02 | −1.2677E−02 | −3.6113E−03 | 1.6325E−04 | −3.2743E−04 | 1.3436E−06 | 0.0000E+00 | 0.0000E+00 | 0.0000E+00 |
| S10 | −7.9135E−03 | 2.4180E−03 | 1.2272E−03 | 3.7502E−05 | 1.7844E−04 | −2.2222E−05 | 0.0000E+00 | 0.0000E+00 | 0.0000E+00 |
| S11 | −2.1804E−01 | 1.1774E−01 | 2.6779E−02 | −1.4647E−02 | 4.6411E−03 | −3.5835E−03 | 1.5684E−03 | −2.9858E−04 | 7.4289E−06 |
| S12 | −1.2807E−01 | −4.4552E−02 | 1.4192E−02 | −3.0468E−03 | 3.1009E−04 | 4.0434E−05 | −1.9363E−05 | 2.5283E−06 | −1.1326E−07 |
| S13 | −5.9922E−02 | −2.5627E−02 | −3.5859E−03 | 4.3160E−03 | −1.3581E−03 | 2.7096E−04 | −3.5287E−05 | 2.5917E−06 | −7.9211E−08 |
| S14 | −3.0502E−01 | 1.3111E−02 | −1.4713E−02 | 5.8729E−03 | −1.0607E−03 | 5.5696E−05 | 2.0309E−05 | −4.2821E−06 | 2.4655E−07 |

Figure 15A:
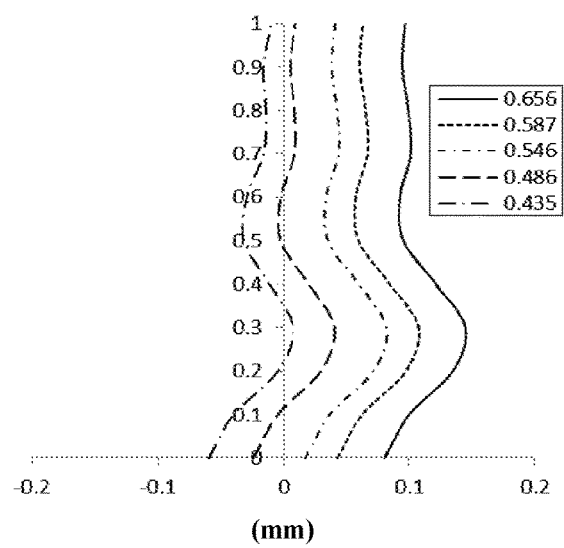
FIGS. 15A to 15C show a longitudinal aberration curve, astigmatism curve and distortion curve of the zoom lens according to Embodiment 4 of the present application when it is in the initial state, respectively.
Figure 15B:
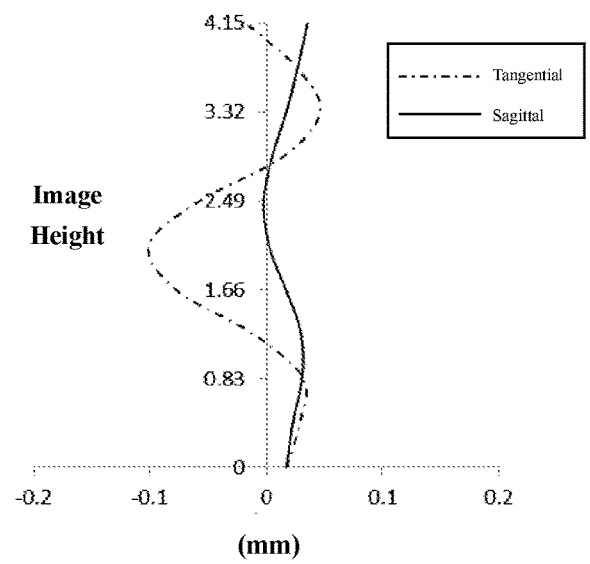
Figure 15C:
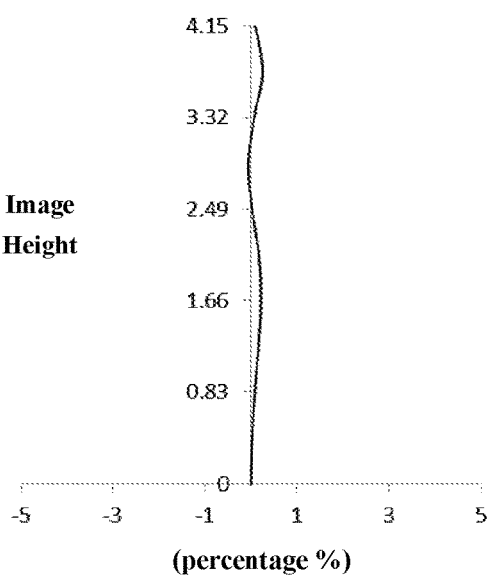
Figure 16A:
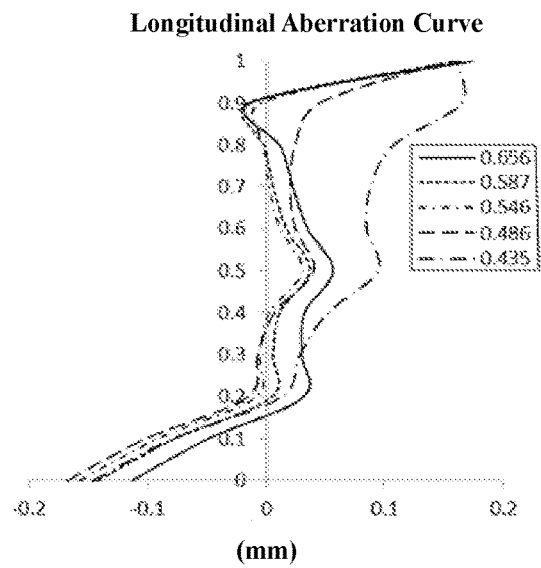
FIGS. 16A to 16C show a longitudinal aberration curve, astigmatism curve and distortion curve of the zoom lens according to Embodiment 4 of the present application when it is in the final state, respectively.
Figure 16B:
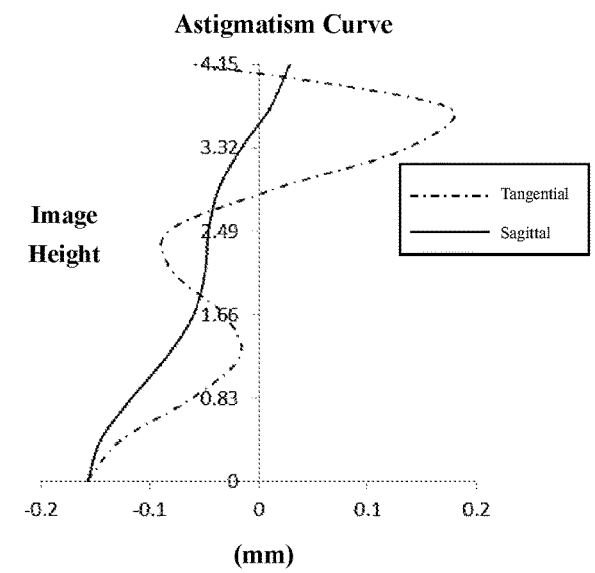
Figure 16C:
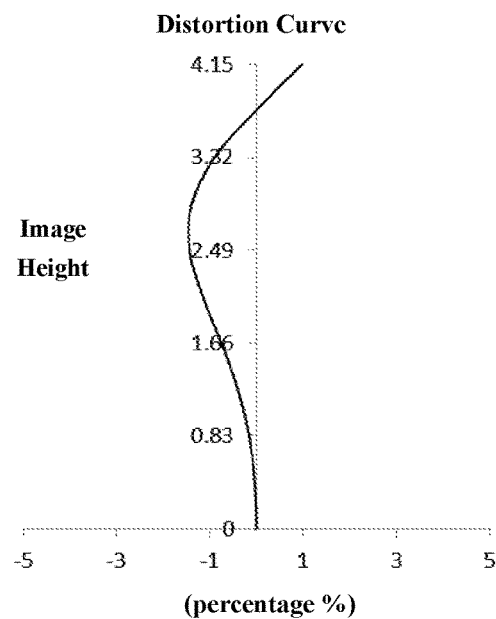

FIGS. 15A and 16A show longitudinal aberration curves of the zoom lens of Embodiment 4 when it is in the initial state and the final state, respectively, wherein the longitudinal aberration curve represents the deviation of the converged focal point after light of different wavelengths passes through the lens. FIGS. 15B and 16B show astigmatism curves of the zoom lens of Embodiment 4 when it is in the initial state and the final state, respectively, wherein the astigmatism curve represents the curvature of the tangential image plane and the curvature of the sagittal image plane. FIGS. 15C and 16C show distortion curves of the zoom lens of Embodiment 4 when it is in the initial state and the final state, respectively, wherein the distortion curve represents distortion magnitude values corresponding to different image heights. According to FIGS. 15A to 16C, it can be seen that the zoom lens given in Embodiment 4 can achieve good imaging quality in all states.

In summary, Embodiments 1 to 4 satisfy the relationships shown in Table 13, respectively. Wherein, F2 is in the initial state.

TABLE 13

| Conditional expression\Embodiment | 1 | 2 | 3 | 4 |
|---|---|---|---|---|
| ft/fs | 1.40 | 1.37 | 1.36 | 1.36 |
| \|Δf\|/\|ΔTTL\| | 1.84 | 1.72 | 1.70 | 1.74 |
| F1/\|Δf\| | 1.28 | 1.36 | 1.39 | 1.37 |
| F1/F2 | −1.59 | −1.47 | −1.44 | −1.45 |
| \|Δf\|/CT1 | 2.52 | 2.38 | 2.36 | 2.40 |
| (f2 − f3)/(f4 − f5) | −0.72 | −0.86 | −0.95 | −0.98 |
| ft/(f6 − f7) | 0.60 | 0.32 | 0.28 | 0.34 |
| R7/R8 | −1.24 | −1.54 | −1.90 | −2.17 |
| ΣCT/(CT5 + CT6) | 2.69 | 2.52 | 2.30 | 2.18 |
| (T56 + T67)/ΣAT (Initial state) | 0.62 | 0.62 | 0.61 | 0.61 |
| (T56 + T67)/ΣAT (Final state) | 0.63 | 0.62 | 0.62 | 0.60 |
| (T12s + T23s)/(T12t + T23t) | 1.01 | 0.99 | 0.98 | 0.97 |

The present application further provides an imaging device, of which an electronic photosensitive element may be a Charge-Coupled Device (CCD) or a Complementary Metal Oxide Semiconductor element (CMOS). The imaging device may be an independent imaging device such as a digital camera, or may be an imaging module integrated in a mobile electronic device such as a mobile phone. The imaging device is equipped with the zoom lens described above.

The above description is only the preferred embodiments of the present application and the explanation of the applied technical principle. It should be understood by those skilled in the art that the scope of disclosure involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

What is claimed is:

1. A zoom lens, comprising, in order from an object side to an image side along an optical axis:
   a first lens group, comprising a first lens disposed along the optical axis, wherein the first lens has a positive focal power, wherein the first lens group is fixed; and
   a second lens group, comprising a second lens, a third lens, a fourth lens, a fifth lens, a sixth lens, and a seventh lens disposed in order along the optical axis, wherein the second lens has a negative refractive power, the third lens has a negative focal power, the fourth lens has a negative focal power, the fifth lens has a positive refractive power, the sixth lens has a negative refractive power, and the seventh lens has a negative refractive power;
   wherein positions of the first lens to the seventh lens on the optical axis are changed to achieve continuous zooming of the zoom lens, wherein the change in positions of the first lens to the seventh lens on the optical axis refers to adjusting the separation distance between any two adjacent lenses of the first lens to the seventh lens on the optical axis, and the first lens is fixed; and
   a total effective focal length ft of the zoom lens when it is in a final state and a total effective focal length fs of the zoom lens when it is in an initial state satisfy 1.3<ft/fs<1.5, wherein the final state is a state in which the zoom lens has a longer focal length relative to the initial state.

2. The zoom lens according to claim 1, wherein a difference Δf between the total effective focal length of the zoom lens when it is in the initial state and the total effective focal length of the zoom lens when it is in the final state, and a difference ΔTTL between a distance from an object side surface of the first lens to an imaging plane of the zoom lens on the optical axis when the zoom lens is in the initial state and a distance from the object side surface of the first lens to the imaging plane of the zoom lens on the optical axis when the zoom lens is in the final state satisfy 1.51<|Δf|/|ΔTTL|<2.0.

3. The zoom lens according to claim 1, wherein an effective focal length F1 of the first lens group and a difference Δf between the total effective focal length of the zoom lens when it is in the initial state and the total effective focal length of the zoom lens when it is in the final state satisfy 1.2<F1/|Δf|<1.5.

4. The zoom lens according to claim 1, wherein an effective focal length F1 of the first lens group and an effective focal length F2 of the second lens group satisfy −1.6≤F1/F2<−1.4.

5. The zoom lens according to claim 1, wherein a difference Δf between the total effective focal length of the zoom lens when it is in the initial state and the total effective focal length of the zoom lens when it is in the final state, and a center thickness CT1 of the first lens on the optical axis satisfy 2.0<|Δf|/CT1<2.6.

6. The zoom lens according to claim 1, wherein an effective focal length f2 of the second lens, an effective focal length f3 of the third lens, an effective focal length f4 of the fourth lens, and an effective focal length f5 of the fifth lens satisfy −1.0<(f2−f3)/(f4−f5)<−0.5.

7. The zoom lens according to claim 1, wherein the total effective focal length ft of the zoom lens when it is in the final state, an effective focal length f6 of the sixth lens, and an effective focal length f7 of the seventh lens satisfy 0.2<ft/(f6−f7)<1.0.

8. The zoom lens according to claim 1, wherein the zoom lens further comprises a diaphragm disposed between the third lens and the fourth lens, and
   during zooming of the zoom lens, the diaphragm is movable along a direction of the optical axis.

9. The zoom lens according to claim 1, wherein a radius of curvature R7 of an object side surface of the fourth lens and a radius of curvature R8 of an image side surface of the fourth lens satisfy −2.5<R7/R8<−1.0.

10. The zoom lens according to claim 1, wherein a sum $\Sigma CT$ of center thicknesses of the first lens to the seventh lens on the optical axis, a center thickness CT5 of the fifth lens on the optical axis, and a center thickness CT6 of the sixth lens on the optical axis satisfy $2.0<\Sigma CT/(CT5+CT6)<3.0$.

11. The zoom lens according to claim 1, wherein a separation distance T12s between the first lens and the second lens on the optical axis when the zoom lens is in the initial state, a separation distance T23s between the second lens and the third lens on the optical axis when the zoom lens is in the initial state, a separation distance T12t between the first lens and the second lens on the optical axis when the zoom lens is in the final state, and a separation distance T23t between the second lens and the third lens on the optical axis when the zoom lens is in the final state satisfy $0.9<(T12s+T23s)/(T12t+T23t)<1.1$.

* * * * *